(12) United States Patent
Stromotich

(10) Patent No.: US 8,893,492 B2
(45) Date of Patent: Nov. 25, 2014

(54) WAVE ENERGY CONVERSION SYSTEM

(76) Inventor: Frank Louis Stromotich, West Vancouver (CA)

( * ) Notice: Subject to any disclaimer, the term of this patent is extended or adjusted under 35 U.S.C. 154(b) by 676 days.

(21) Appl. No.: 12/967,072

(22) Filed: Dec. 14, 2010

(65) Prior Publication Data

US 2011/0074159 A1 Mar. 31, 2011

Related U.S. Application Data

(63) Continuation-in-part of application No. PCT/CA2009/000793, filed on Jun. 12, 2009.

(30) Foreign Application Priority Data

Jun. 18, 2008 (CA) ..................................... 2634450

(51) Int. Cl.
F03B 13/18 (2006.01)
(52) U.S. Cl.
CPC ......... *F03B 13/1845* (2013.01); *F05B 2240/97* (2013.01); *F03B 13/181* (2013.01); *Y02E 10/38* (2013.01)
USPC ............................................. 60/499; 60/502
(58) Field of Classification Search
USPC .................. 60/495–507; 290/42, 53; 417/330
See application file for complete search history.

(56) References Cited

U.S. PATENT DOCUMENTS

| 4,091,618 A * | 5/1978 | Jackson .......................... 60/497 |
| 4,599,858 A * | 7/1986 | La Stella et al. ................ 60/497 |
| 4,742,241 A * | 5/1988 | Melvin ............................ 290/53 |
| 7,585,131 B2 * | 9/2009 | Oigarden et al. ............... 405/76 |
| 7,963,111 B2 * | 6/2011 | Doleh et al. .................... 60/497 |

FOREIGN PATENT DOCUMENTS

CA 2408855 A1 * 4/2004

* cited by examiner

*Primary Examiner* — Christopher Jetton

(57) ABSTRACT

An underwater wave energy converter (WEC) (10) has a piston (32) that reciprocates up and down as recurring waves (22) pass over. Downward motion of the piston (32) drives the rods or plungers (50*b*) of a multiplicity of hydraulic jacks (50) to pressurize hydraulic fluid in an energy conversion system. Ultimately, the energy conversion system powers one or more hydraulic motors (511, 512) that drive an electric generator (510) or multiple generators. A sensor system (25) detects characteristics of in-coming waves such as by detecting changes in pressure as in-coming waves (22) pass over the sensor system (25). The sensors can be mounted on the ocean floor seaward from the WECs (10), and a control computer system (231) calculates characteristics of the in-coming waves such as wave height and speed data, and uses the data to control aspects of the WECs (10) and other components of the energy conversion system.

10 Claims, 24 Drawing Sheets

FIG. 6 (POWER STROKE - PRESSURE BOOST) Q3 SS3

FIG. 7 (POWER STROKE - PRESSURE REDUCE) Q3 SS4

FIG. 8 (RETURN STROKE - PRESSURE BOOST) Q1 SS1

FIG. 9 (RETURN STROKE - PRESSURE REDUCE) Q1 SS2

FIG. 10  (POWER STROKE - PRESSURE BOOST - Motor-Pump) Q3 SSS3

FIG. 11 (POWER STROKE - PRESSURE REDUCE - Motor-Pump) Q3 SSS4

FIG. 12 (RETURN STROKE - PRESSURE BOOST - Motor-Pump ) Q1 SSS1

FIG. 13 (RETURN STROKE - PRESSURE REDUCE - Motor-Pump) Q1 SSS2

FIG. 14 (DUAL - POWER STROKE - PRESSURE BOOST) Q3 SS3

FIG. 15 (DUAL - RETURN STROKE - PRESSURE BOOST) Q1 SS1

FIG. 16 (TRIPLEX - POWER STROKE - PRESSURE BOOST) Q3 SS3

FIG. 18 (POWER STROKE - PRESSURE BOOST - Class C)

FIG. 19 (RETURN STROKE - PRESSURE BOOST - Class C)

FIG. 20 - (WEC with helical hydraulic actuators)

WAVE ENERGY CONVERSION SYSTEM

CROSS-REFERENCE TO RELATED APPLICATION

This is a U.S. National Phase application, as a continuation in part, and claims priority and the benefit thereof of Canadian Patent Application No. 2,634,450, filed Jun. 18, 2008, PCT/CA2009/000793 and application 33392PCT filed in Canada on Jun. 12, 2009 and designating the United States, published as WO2009/152606 A1, which is expressly incorporated by reference herein and now includes further improvements.

BACKGROUND

The present invention relates to ocean wave energy converters, particularly for application near shore, and more particularly to a novel system of wave energy converters having hydraulic components for converting energy of recurring waves to electric energy.

The publications listed below are expressly incorporated by reference herein and describe prior approaches to convert energy of ocean waves to another form of usable energy, such as electric energy:

Burns: International Patent Publication No. WO 2004/0003380;

Burns: International Patent Publication No. WO 2007/019640;

Gardner: U.S. Pat. No. 6,256,985;

Stromotich: Canadian Patent Application No. 2 408 855.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an embodiment of the present invention, several underwater wave energy converters (WECs) are provided, each having a piston that reciprocates up and down as recurring waves pass over. Downward motion of the piston drives the rods or plungers of a multiplicity of hydraulic cylinders to pressurize hydraulic fluid in an energy conversion system. Ultimately, the energy conversion system powers one or more hydraulic motors that drive an electric generator or multiple generators.

In one aspect of the present invention, a sensor system detects characteristics of incoming waves, such as by detecting changes in pressure as an incoming wave passes over an array of sensors. The sensors can be mounted on the ocean floor seaward from the WECs. A computer system calculates characteristics of the incoming waves, such as wave height and speed from data read from the sensors. Such information is used to control aspects of the WECs and other components of the energy conversion system. For example, preferably the sensor system and computer calculation are used for discrete switching of hydraulic fluid flow and operation of hydraulic components associated with each WEC, the object being to efficiently convert potential and kinetic energy of selected ocean waves and to transmit power to consumers on shore.

In another aspect of the invention, each WEC includes an upper deflector that, under computer control, can be positioned to capture energy of an incoming wave and direct it downward toward the vertically reciprocating piston of a WEC during the downward power stroke. The deflector is retractable, under computer control, at an appropriate time, such as coincidental with a wave trough, when the piston is moved back up.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Terminology

Figure 1:
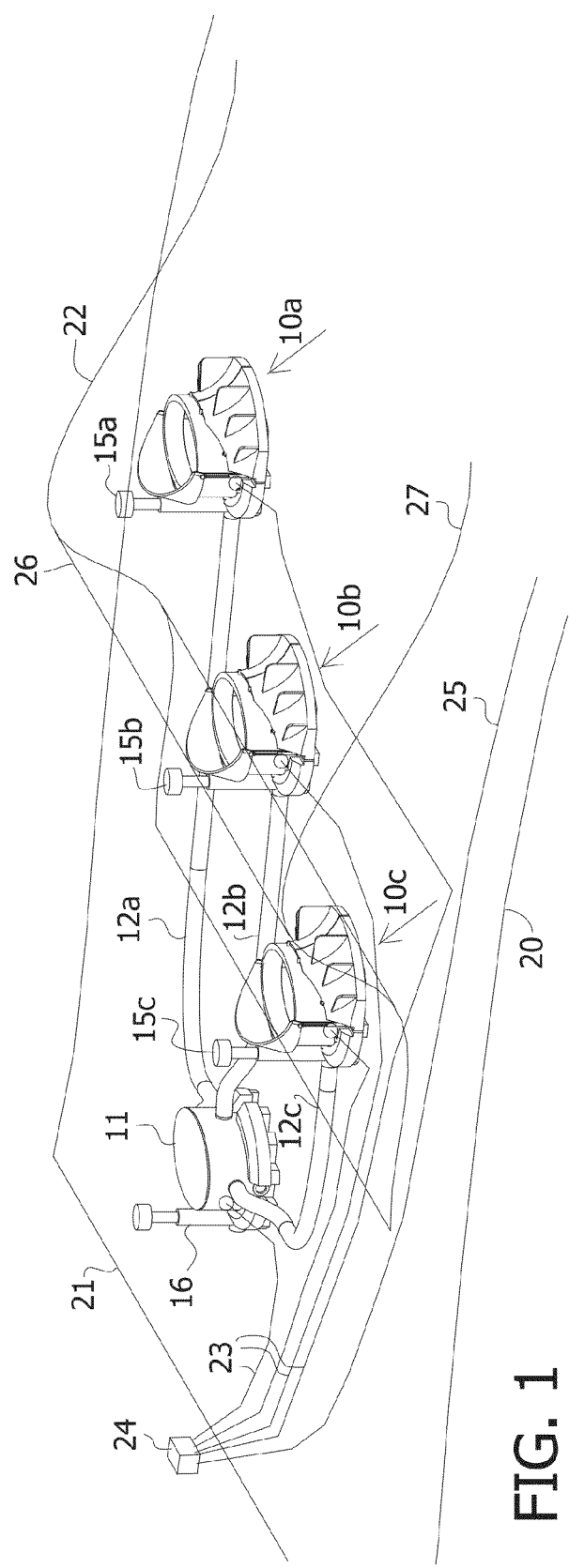
FIG. 1 is a perspective view of components of a wave energy conversion system in accordance with the present invention showing three wave energy converters (WECs) on the ocean floor near shore, connected by cables laid on the sea bed to a utility on shore, with parts shown diagrammatically.

"Terminal" or "line terminal" means a connection point of a hydraulic fluid line to a port of a hydraulic fluid device, such as "input terminal" means a point of flow into a device such as a hydraulic motor, pump, accumulator, "fluid power transformer," and so on, and "outlet terminal" means a point of flow out of a hydraulic device;

"cylinder assembly switching state" means valve positions setting the number of cylinders in groups for operation below a piston thereby adjusting the ratio of wave pressure to fluid pressure at the terminal of the cylinder assembly, where state one means all cylinders in operation, providing lowest fluid pressure and highest fluid flow in communication with the fluid power transformer, and may also include, in the alternative, a second group of cylinders whose fluid flow by-passes the fluid power transformer and communicates directly with an accumulator for that purpose;

"fluid power transformer" means a device of a known configuration (Class C) or an inventive configuration (Class A of Class B) that transforms fluid power from one particular combination of pressure and flow at the input terminals to another combination of pressure and flow at the output terminals, analogous to an electric power transformer, and also includes a known Class C transformer with an inventive switching arrangement;

"fluid transposing switch" means a switching device for use with a fluid power transformer comprising multiple two-way valves, with position indicator mechanism, for transposing the fluid lines to a hydraulic motor with the fluid lines to a hydraulic pump in the configuration where a pump serves in place of a fluid motor operating in regenerative mode;

"fluid piping network switching state" means a particular set of fluid control valve positions and motor displacement settings that facilitate hydraulic fluid flow through the fluid power transformer during a power-stroke and return-stroke power production cycle;

"fluid energy swing" means a system for transferring fluid energy between a power-stroke and a return-stroke by communication between a hydraulic cylinder assembly and an accumulator without need for hydraulic rotary equipment;

"ocean-wave-degree" means a unit of measurement in units of time or distance, equivalent to the period of an ocean wave divided by 360, the number of degrees in a wave cycle, used in a context analogous to degrees-before-top-dead-center as commonly shown on a scale on an engine block for advancing ignition timing for internal combustion engines; for example, a wave period of 18 seconds computes to a wave speed of 20 ocean-wave-degrees per second;

"wave state vector" means a two-dimensional vector representation of the wave within a computer control system, which includes separate vectors for the wave peak and the wave trough, the "wave peak vector" defines the location of the vertical axis of the wave crest in units along the x-axis corresponding to distance in feet from piston center, and the elevation of the wave crest in units along the y-axis corresponding to elevation in feet relative to the top of shell opening; the wave trough vector defines the location of the vertical axis of the wave trough in units along the x-axis corresponding to distance in feet from piston axis center, and elevation of the wave trough represented in units along the y-axis corresponding to elevation in feet relative to the top of shell opening; the wave peak vector minus the wave trough vector equals the wave vector, the real component of which equals the horizontal distance between the peak axis and trough axis of the wave and the imaginary or quadrature component equals the wave height in absolute terms; the wave vector is used within the computer to select those waves that can be harvested efficiently as they approach the WEC; other wave vectors may be computed to monitor distant waves as they approach from farther off-shore;

"vector drive" means a system with computer control for optimal functioning of the WEC, which includes sensing a train of on-coming waves, computing their wave state vectors, setting the switching states for the cylinder assembly and the fluid power transformer for various operating conditions as they develop, initiating and controlling the transmitting of energy during the power-stroke-return-stroke power production cycle, and transmitting electric power across the underwater cables to a user on shore.

Figure 6:
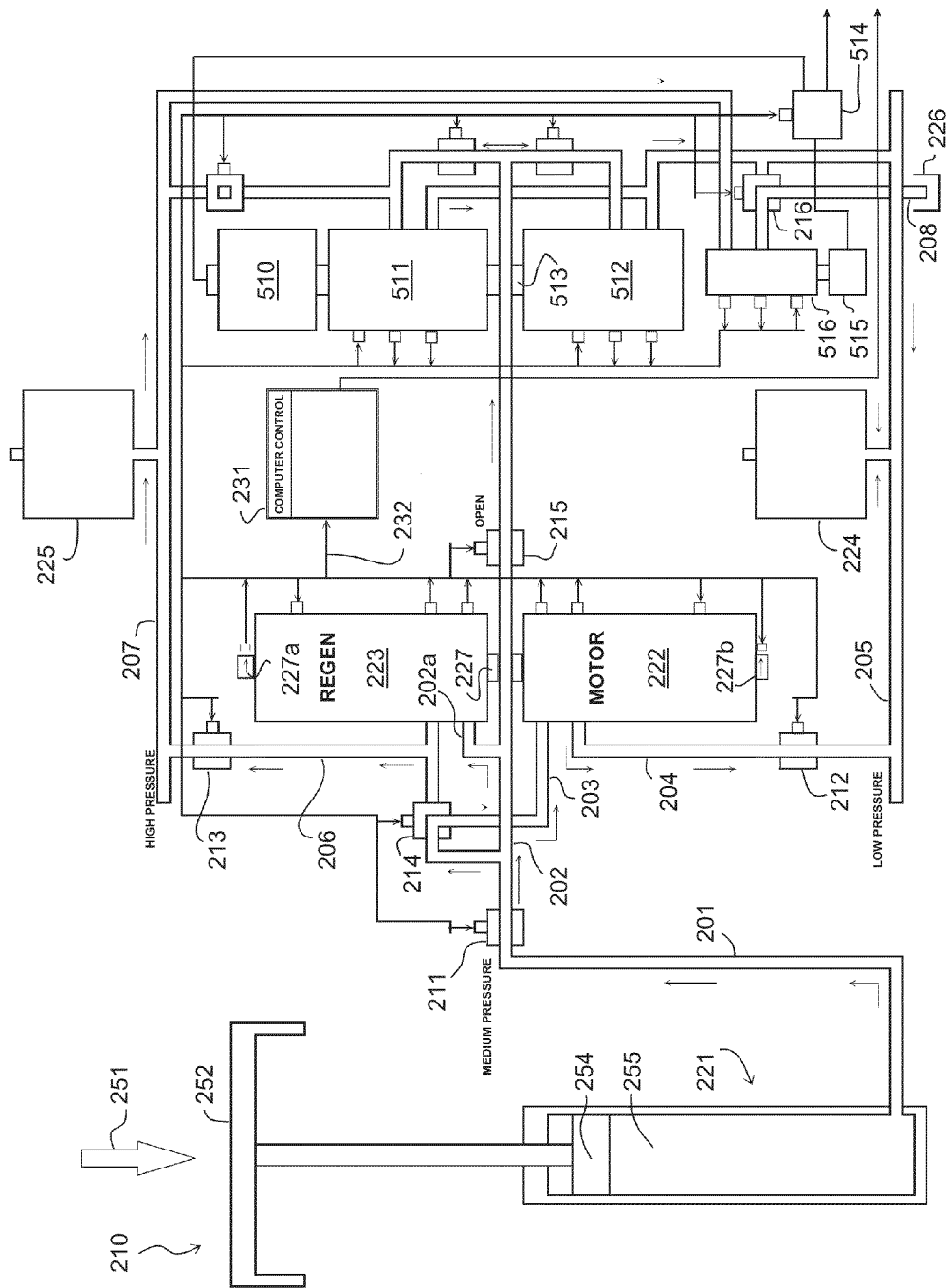
FIG. 6 is a schematic representation of hydraulic fluid energy conversion equipment of a wave energy conversion system in accordance with the present invention, with a WEC operating in power stroke to boost pressure through a fluid power transformer and push fluid to storage in an accumulator.
Figure 7:
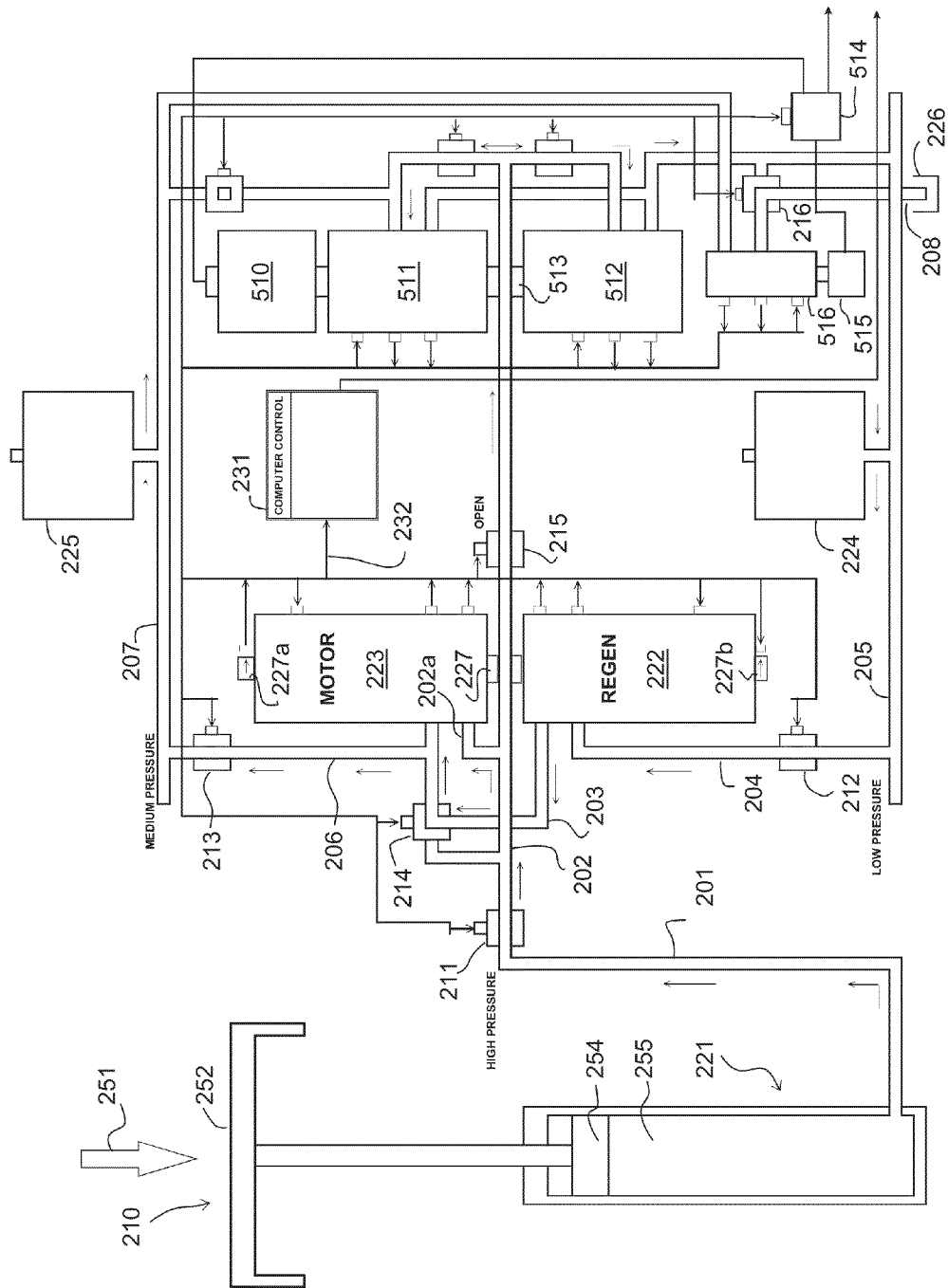
FIG. 7 is a schematic representation similar to FIG. 6 with the WEC operating in a power stroke, except with pressure being reduced through the fluid power transformer and fluid flowing to storage in the accumulator.
Figure 8:
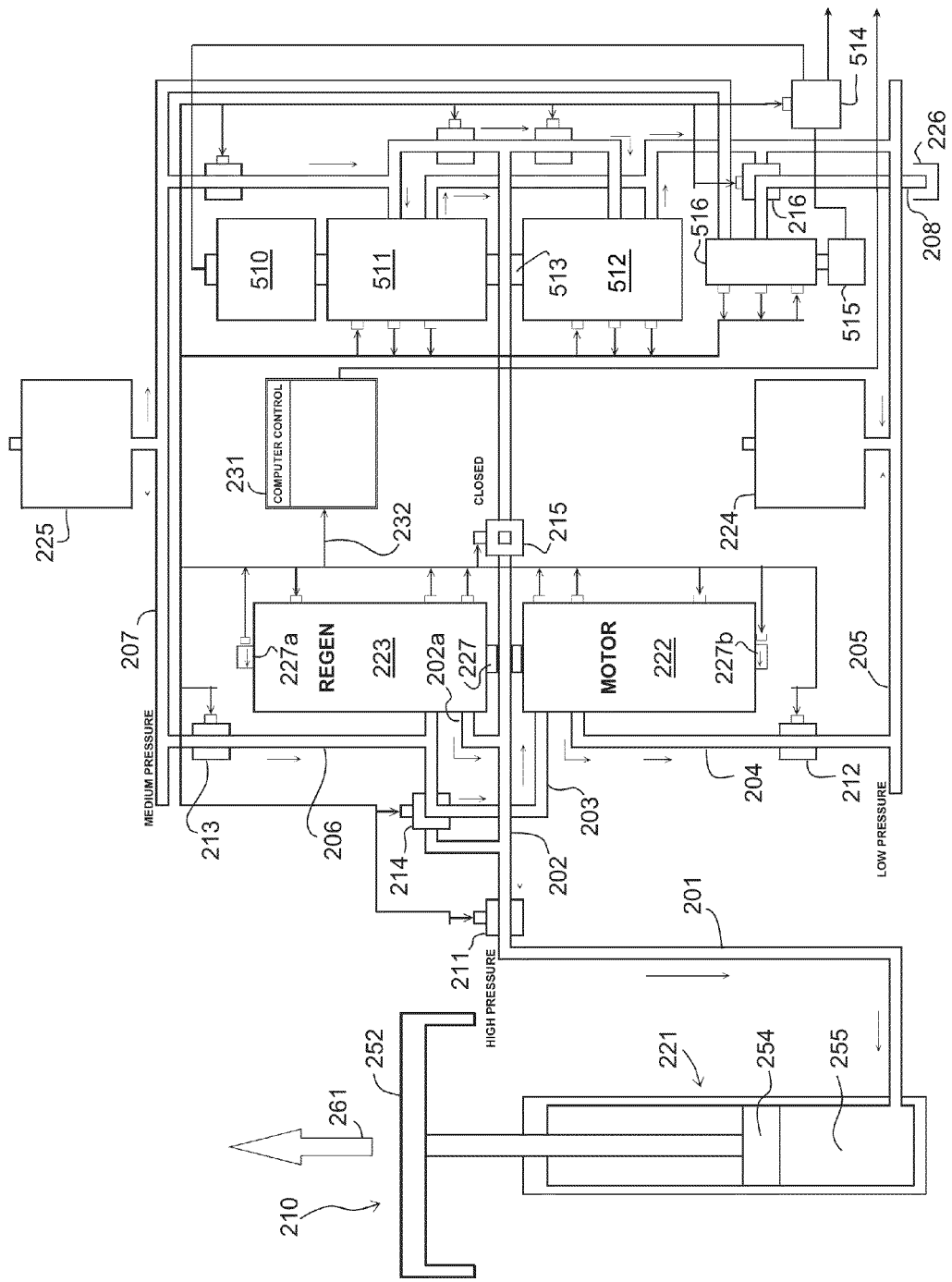
FIG. 8 is a schematic representation similar to that of FIG. 6, with the WEC operating in return stroke with pressure from the accumulator being boosted through the fluid power transformer and fluid flowing to the cylinder assembly to lift the piston to its top position.
Figure 9:
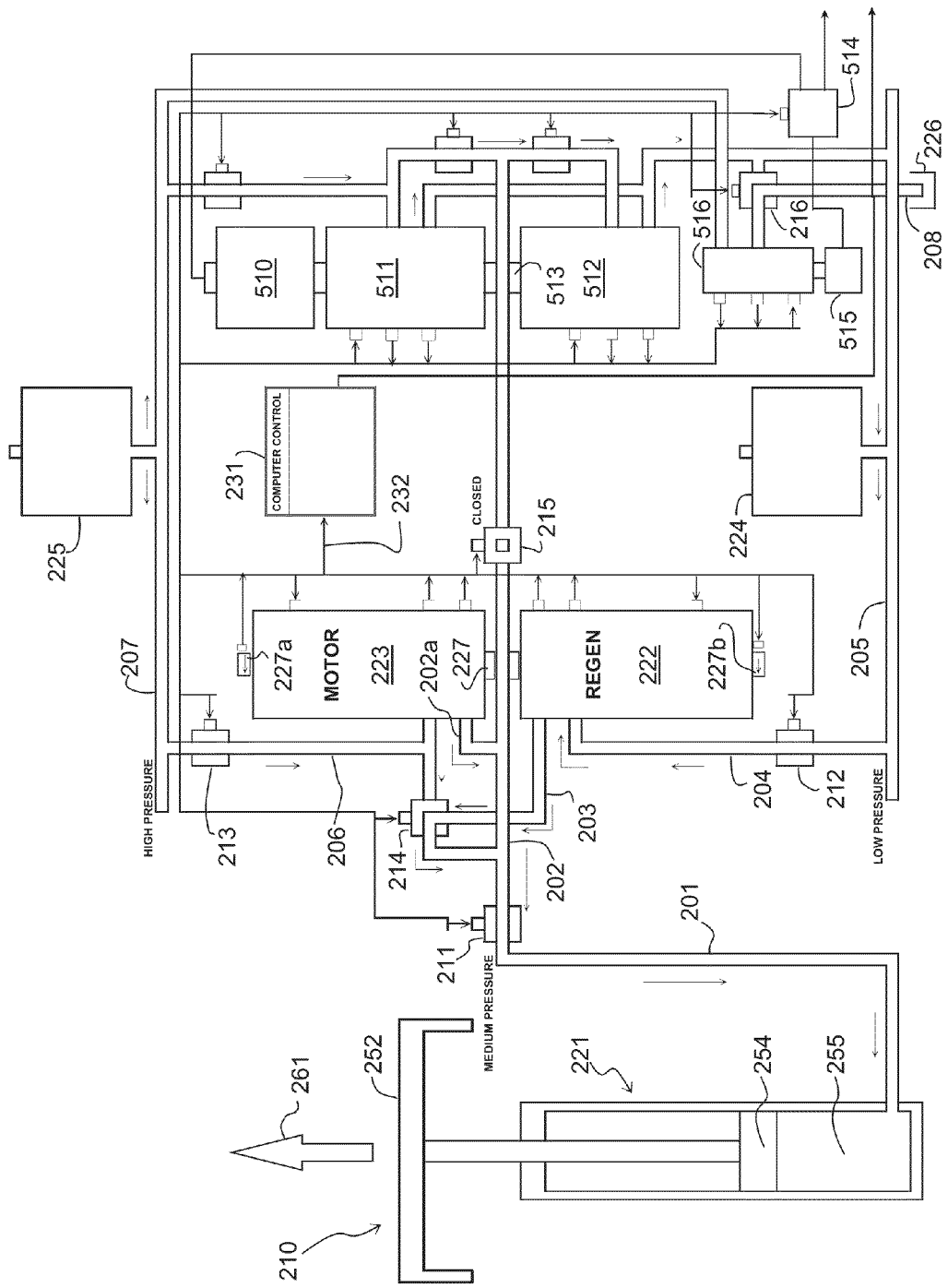
FIG. 9 is a schematic representation similar to FIG. 8, with the WEC operating in the return stroke, except with pressure from the accumulator being reduced through the fluid power transformer and fluid flowing to the cylinder assembly to lift the piston to top position.

Operation overview of Vector Drive is explained with reference to FIG. 17 and the power-stroke shown as it would begin in FIG. 2. An optimum state estimator algorithm within the WEC control computer computes the wave vectors and the energy capability of the WEC for a complete power-stroke-return stroke cycle, and uses that dynamic model to control WEC operation. The fluid energy passes from the cylinder assembly below the main piston, through the fluid power transformer to the accumulator during the power-stroke and from the accumulator back through the fluid power transformer to the cylinder assembly to lift the piston during the return-stroke. As the wave crest moves over the top of the piston, seconds in advance of the axis of the crest aligning with the axis of the piston, say 30-35 ocean wave degrees in advance of top-dead-centre of the vertical axis of the piston, the computer switches the fluid piping network and the fluid flow by displacement control of the hydraulic rotating devices as shown in FIG. 6 or FIG. 7, to start the piston in motion and achieve maximum force-times-distance through the power-stroke, similar to that of an engine when ignition is applied say 30-35 mechanical degrees in advance of top-dead-centre for maximum torque. Similarly during the return-stroke, shown as it would begin in FIG. 3, seconds before the wave trough axis aligns with the piston axis, the computer switches the fluid piping network and the fluid flow by displacement control of the hydraulic rotating devices as shown in FIG. 8 or FIG. 9, and hydraulic cylinders return the piston to top position, while discharging seawater like a combustion engine discharges exhaust gases. When wave heights are less than design maximum for the converter, the stroke is reduced so as not to waste energy for an unnecessarily long return-stroke.

Consider an ideal system with no losses and the WEC operating in a calm sea with the shell submerged. The fluid energy generated during power-stroke equals the fluid energy consumed to return the piston to top position. Energy for hydraulic fluid system losses, is drawn from storage in an accumulator, analogous to fuel drawn from the fuel tank for engine losses while idling a combustion engine. Selecting the appropriate "cylinder assembly switching state" is analogous to shifting gears up and down, in accordance with wave height, to keep cylinder operating pressure as close as possible within the high efficiency operating range of about 20% pressure variation between input and output for the preferred fluid power transformer, which in turn is optimally adjusted to facilitate flow and minimize fluid transmission losses.

Computer optimal control techniques are commonly used in state-of-art motor vehicles. The operation of the main power piston of the inventive WEC is analogous to the operation of the pistons in an internal combustion engine. The inherent variable-piston-displacement feature of the WEC is analogous to the displacement-on-demand feature of current-art efficiency improved combustion engines, where it is claimed under light load conditions up to 4 cylinders of an 8 cylinder engine will shut down automatically to improve efficiency up to 25 percent. Optimal WEC operation follows concepts analogous to state-of-art motor vehicle terms like spark-advance before top-dead-center, combustion monitoring, feedback to adjust the ignition timing for the next power-stroke to maximize efficiency, supercharging, displacement on demand, gear-shifting, etc. In high-end automobiles, the engine and transmission control systems adapt to changing conditions, seemingly learning as the car is driven along, and readjusting to changing situations, a control strategy commonly known as sub-optimal adaptive computer control. The proposed invention uses state-of-the-art optimal control systems for monitoring power conversion operation to maximize efficiency and computer graphics for displaying performance, and the on-coming wave. An algorithm in the computer control system provides a running state estimate of the ocean wave as it approaches within about one wave length of the converter. Optimal control is achieved with state-of-art computer control devices commonly called PLC and DCS controls, which receive input from sensors on all aspects of the inventive WEC and particularly pressure along the seabed under the on-coming waves.

An important object of the invention is to transmit hydraulic fluid energy substantially more efficiently than state-of-art fluid transmission through to the electric generator, and particularly through the fluid power transformer, where losses are concentrated in state of art devices. The fluid power transformer serves to transfer energy from the converter piston during the power-stroke to the accumulator and from the accumulator to the converter piston during the return-stroke. The fluid power transformer is optimally adjusted to facilitate flow and minimize energy losses: during the power-stroke output pressure is amplified to match pressure in the accumulator as pressure gradually rises as energy is accumulated. Flow is continually adjusted to optimally control piston velocity throughout the power-stroke to maximize energy in each stroke, minimize energy losses, and maximize overall efficiently. Part of the flow during the power-stroke is directed to a low pressure accumulator to provide a pressure float for the return-stroke to minimize return-stroke energy. At the bottom of the power-stroke, the fluid power transformer is switched to facilitate the return-stroke and the optimizing function repeated to minimize the energy expended to discharge the seawater into the lowest point in the wave trough, return the piston to the top position and await the next wave crest to move into position, and then open the valves to begin the power-stroke.

Efficiency of the inventive WEC is substantially improved with the inventive fluid power transformer over the state-of-art, over the entire range of operating conditions, including boosting and reducing pressure, for both forward and reverse power flows. For efficiency comparison, the best choice of fluid power transformer state-of-art for the inventive WEC application consists of a variable displacement driving motor rotatably coupled to a variable displacement pump. Driving torque equals driven torque. Flow times pressure at the input terminals is approximately equal to flow times pressure at the output terminals when losses are small. An ideal fluid power transformer has no losses. Known state-of-art fluid power transformers pass all the energy through two rotary devices rotatably connected in series such that losses of the driving motor compound the losses of the driven pump resulting in high overall losses.

For example, 80% transmission efficiency for each rotary unit compounds to an input requirement which computes as (1/0.80/0.80) to 1.56 per unit input for 1.0 per unit output, or 64% transmission efficiency overall, and 36% losses.

In contrast the inventive fluid power transformer is configured so both rotary devices are connected at a common terminal, that being the input terminal when output pressure is to be increased, and that being the output terminal when output pressure is to be reduced, and a third terminal being the low pressure out flow terminal when output pressure is to be increased, and being the low pressure inflow terminal when output pressure is to be reduced, with the result that for pressure changes of less than 50% most of the power transmitted by-passes the rotary devices and in this way substantially lower losses and substantially higher transmission efficiency is achieved which is apparent from the shaft torque being much lower than state-of-art, for the same power flow. In the inventive fluid power transformer, the discharge device can be a pump or driven motor in regenerative mode, which is driven by the input motor. (The said low pressure terminal connects to a low pressure accumulator which is switchable to a reservoir at atmospheric pressure.) For example when output pressure is boosted relative to input pressure, (through fluid flow is reduced in proportion), the driving motor needs only supply a motor load equivalent to the pumping or driven motor load (regenerative motor load) which is the product of the incremental increase in output pressure and total output flow plus losses for pumping.

For example to boost pressure 10%, power losses by the output motor operating in regenerative mode, as measured at the input shaft to the regenerative motor, are the product of 10% pressure boost and 90% fluid flow and the efficiency factor for this condition which, to use 80% efficiency to be consistent with the prior art example, computes as (0.10× 0.90/0.80) to approximately 0.1125 per unit input to the shaft of the regenerative output motor. Total fluid power to the input motor including losses computes as (0.1125/0.80) to 0.1406 per unit, of which 0.09 per unit is transmitted by the regenerative motor through to the fluid power transformer output terminals. Total losses for the inventive fluid transformer compute to 0.0506 per unit or 5.06%, and overall transmission efficiency computes to approximately 95% compared to 64% efficiency for the aforementioned state-of-art fluid power transformer—with the result that 48% more energy is available for generation.

For example to boost pressure 20%, power losses by the output motor operating in regenerative mode, as measured at the input shaft to the regenerative motor, are the product of 20% pressure boost and 80% fluid flow and the efficiency factor for this condition which, to use 80% efficiency to be consistent with the prior art example, computes as (0.20× 0.80/0.80) to approximately 0.2000 per unit input to the shaft of the regenerative output motor. Total fluid power to the input motor including losses computes as (0.2000/0.80) to 0.2500 per unit, of which 0.16 per unit is transmitted by the regenerative motor through to the fluid power transformer output terminals. Total losses for the inventive fluid transformer compute to 0.09 per unit or 9%, and overall transmission efficiency computes to approximately 91% compared to 64% efficiency for the aforementioned state-of-art fluid power transformer—with the result that 42% more energy is available for generation.

Similarly for a 50% boost in output pressure, power to the input shaft of the regenerative motor computes as (0.5×0.5/0.80) to 0.3125 per unit, fluid power to the input motor computes as (0.3125/0.80) to 0.3906 per unit, of which 0.25 per unit is transmitted by the regenerative motor through to the output terminals. Total losses compute as (0.3906−0.25) to 0.1406 per unit or 14.06%, and overall transmission efficiency computes to about 86% for a pressure boost of 50%, compared to 64% efficiency for the aforementioned state-of-art fluid power transformer—with the result that 34% more energy is available for generation.

From 42% more to 34% more electric power can be generated by the inventive fluid power transformer in the pressure change range of 20% to 50%, compared to state-of-art fluid transformation means. It is preferable that maximum hydraulic system transmission efficiency be realized by selecting a cylinder switching state so the fluid pressure transformer operates within a pressure change range of about 20%.

The same holds true when output pressure is reduced relative to input pressure and fluid through-flow is increased, the additional flow coming by way of the output motor in regenerative mode pumping from the low pressure terminal, as the configuration is essentially the same as if flow through all elements of the fluid power transformer are reversed and the fluid transformer is viewed from the opposite direction.

Figure 18:
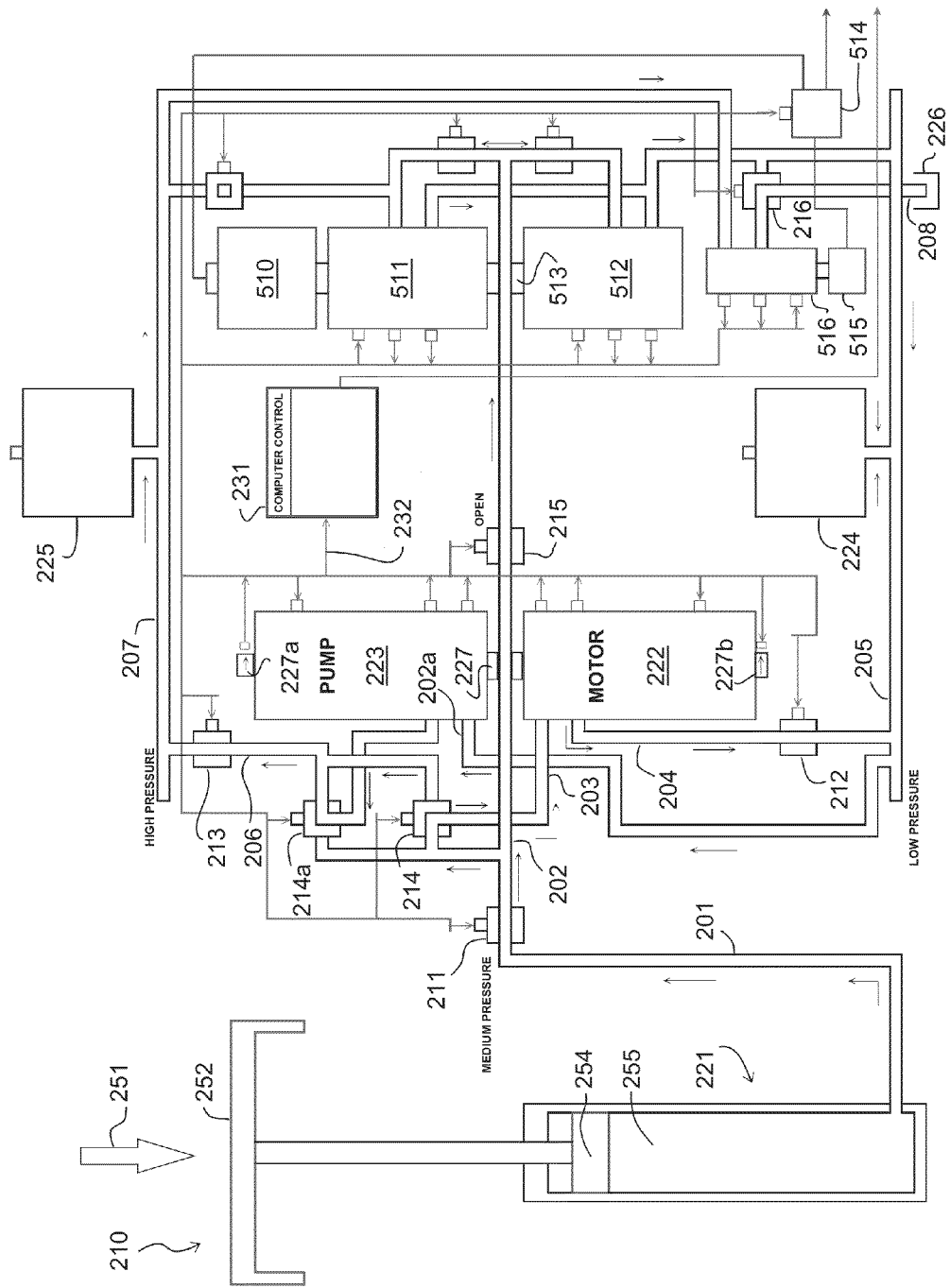
FIG. 18 is a flow diagram of the inventive Class C transformer in power stroke pressure boost.
Figure 19:
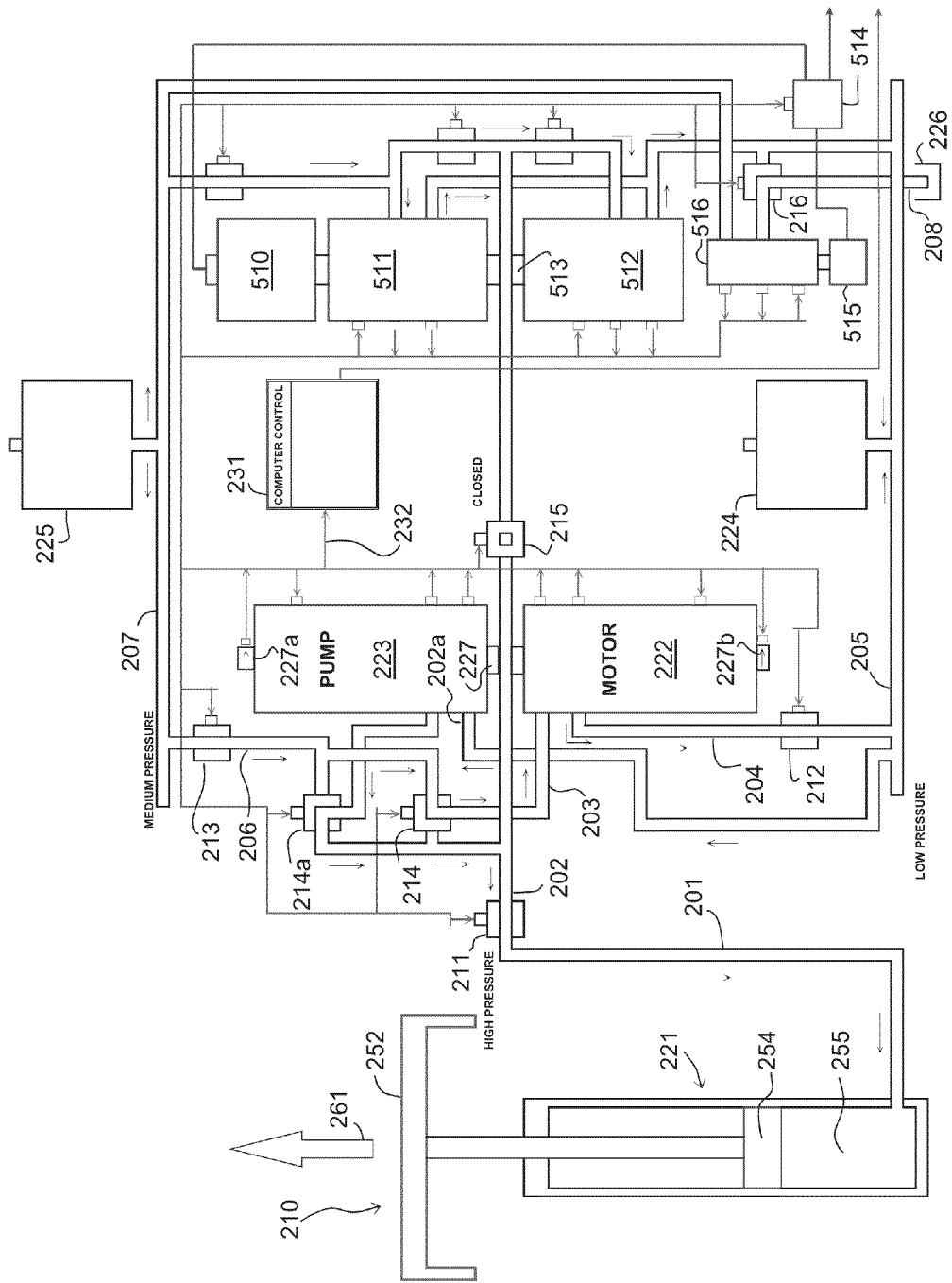
FIG. 19 is a flow diagram of the inventive Class C transformer in return stroke pressure boost.

For purposes of this proposal the fluid power transformer with the aforementioned inventive configuration is known in this document as the Class A configuration because it is substantially higher efficiency than the state-of-art configuration which is known in this document as the Class C configuration. It is preferred that the hydraulic motor units have a reversible variable displacement feature with a plus-100-percent-to-minus-100-percent range for added flexibility. In an alternative inventive configuration to the aforementioned Class A configuration, a further inventive fluid power transformer configuration comprises a pump in place of a motor operating in regenerative mode. The motor and pump are rotatably connected by a common shaft and fluid lines connected by way of fluid transposing switch comprising four 2-way valves so the pump is always in place of the regenerative motor and the inventive configuration including said transposing switch is known in this document as the Class B configuration. The inventive Class A and Class B transformers utilize a single-pole two-position fluid transfer switch 214 to affect all the combinations of power stroke and return stroke with pressure boost and pressure reduce, as shown in FIGS. 6 to 16. The inventive Class C transformer as shown in FIGS. 18 and 19 utilizes a double-pole two-position fluid transfer switch 214, 214a to affect the power stroke and return stroke. The motor 222 and the pump 223 retain their respective positions similar to motor 323 and pump 322 in FIGS. 10 to 13.

The vector drive is the overall control system for the wave energy converter which includes the cylinder assembly below the piston, the fluid power transformer(s), the accumulator(s) and the hydraulic motor(s) that drive the electric power generator(s).

The vector drive takes ocean power in the form of alternating ocean waves of variable frequency, computes the wave particulars, and converts wave power to alternating current electric power of constant frequency in synchronism with the electric utility receiving the power. The vector drive of the inventive WEC is analogous to a mirror image of known electric power system art, where variable frequency drives take power from a constant frequency source, convert it to direct current power and then invert it to variable frequency alternating current power to drive an induction motor at a predetermined speed and direction which corresponds to the frequency and phase sequence, respectively, of the power produced. The inventive vector drive for ocean wave generation, where electric power is used to generate waves, is the mirror image of the inventive vector drive for power generation.

In the known electric power system, inertia effects are minimized for fast response by using induction motors and extremely fast solid-state circuitry for switching voltage and current. Similarly, in this inventive WEC, inertial effects are minimized for fast piston response. The underside of the converter piston is fixed to a rigid structural aluminum frame, with mass kept to a minimum, allowing the piston to respond quickly when the valves are opened to begin the power-stroke, and stop quickly at the end of the power-stroke, then restart quickly into the return-stroke to exhaust water from the converter chamber into the wave trough, and stop again at top position—a total of 2 stops and 2 starts per WEC cycle.

The fluid power transformer in combination with the accumulator going through power-stroke and return-stroke functions analogous to a flywheel in a combustion engine, except that fluid transfer losses are much higher than bearing losses and judicious operation is required to minimize fluid power losses. It is another object of the inventive WEC to provide means for energy exchange without significant efficiency losses, in the nature of a fluid energy swing more closely analogous to a flywheel effect, between the piston and an accumulator directly without rotary hydraulic motors or pumps. This fluid energy swing is analogous to a gas-pressurized shock absorber added into a motor vehicle, completely independent of other functions. The variability comes with increasing or reducing the gas pressure and the number of hydraulic cylinders in the energy swing circuit.

It is known WECs lose effectiveness as piston dimension in the direction of the on-coming wave increases to about ¼ wave length. In the preferred arrangement, the shell and the piston are elliptical with wall thickness increased near the minor diameter to strengthen the shell in the direction of the incoming wave. An elliptical converter harvests a wider swath through an incoming ocean wave, restricted only by its minor axis, whereas a circular converter, where both major and minor diameters are the same, becomes less effective as its width increases beyond ¼ wave length. An elliptical rollable annular seal functions smoothly like a circular seal, without a tendency to rotate, and a pressure surface approximately 78% of a rectangular piston surface, without the disadvantage of reduced reliability that would result from a sharp corner in a rollable seal.

General

Aspects of an embodiment of a wave energy conversion system in accordance with the present invention are shown in FIG. 1. Several wave energy converters (WEC's) 10a, 10b and 10c are installed on the ocean floor 20. Preferably the location of installation is near shore 21, where energy of waves 22 have a significant translation component toward the shore. In deeper water, the motion of water particles is more nearly orbital. As described in more detail below, each WEC has a piston designed to translate up and down as recurring waves pass over it. The piston rides in an open topped shell to which it is sealed such that the volume of the shell bound at the top by the piston varies. The interior volume of each WEC is vented to the atmosphere, such as by a vent pipe 15a, 15b, or 15c, which is sufficiently tall as to extend above the water. Alternatively, or additionally, communication to the atmosphere can be shared by way of vent piping 12a, 12b, and 12c that communicates with a shared vent pipe 16, by way of canister 11 mounted closer to the shore. Canister 11 with its shared vent pipe 16 serve as an alternate communication vent to atmosphere where high waves may be over topping the individual vents on the WECs.

In the embodiment represented in FIG. 1, the WECs are offset relative to the incoming wave crest 26 and trough 27. Thus, the pistons of the individual WECs, which act independently, do not reciprocate in synchronism. Rather, the pistons move down and up sequentially for a smoother power flow. More specifically, in a representative embodiment the most seaward WEC 10a will first encounter the wave crest 26 and operate in a downward power stroke, followed by the next most seaward WEC 10b, and finally the least seaward, WEC 10c. The return stroke of each piston occurs as the wave trough 27 passes over. The up and down reciprocation of the pistons drives a system of hydraulic cylinders, there being multiple hydraulic cylinders beneath each piston. Hydraulic fluid pressurized in the down stroke ultimately drives one or more rotary hydraulic motors connected to an electric generator. Energy of the pressurized hydraulic fluid can be stored in accumulators. Power and system control cables 23 connect the WECs to an electrical distribution surface structure 24 of an under ground electrical distribution system on shore. The control cables include fiber optic lines or other signal transmitting lines from a computer control center to components of the WECs and the hydraulic energy conversion system. Preferably, the control system includes an array of pressure sensors 25, which detect characteristics of incoming waves prior to the waves passing over the WECs. The computer control system calculates characteristics of the individual waves, such as wave height and speed, thereby estimating the energy of the on-coming wave and controlling aspects of the wave energy conversion system accordingly.

Wave Energy Converter Construction

Figure 2:
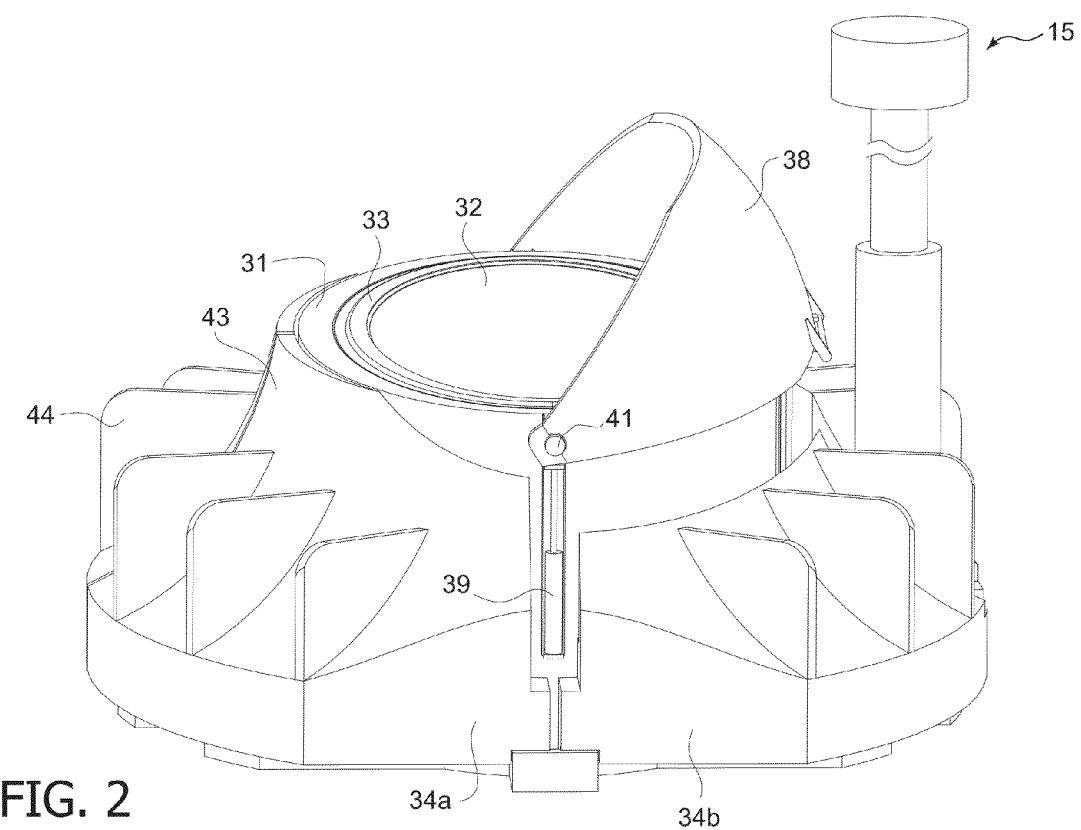
FIG. 2 is a perspective view of one of the WECs of FIG. 1, such one WEC having a piston at top position with a deflector fully raised to capture as much energy as possible from an oncoming ocean wave during a power stroke.
Figure 3:
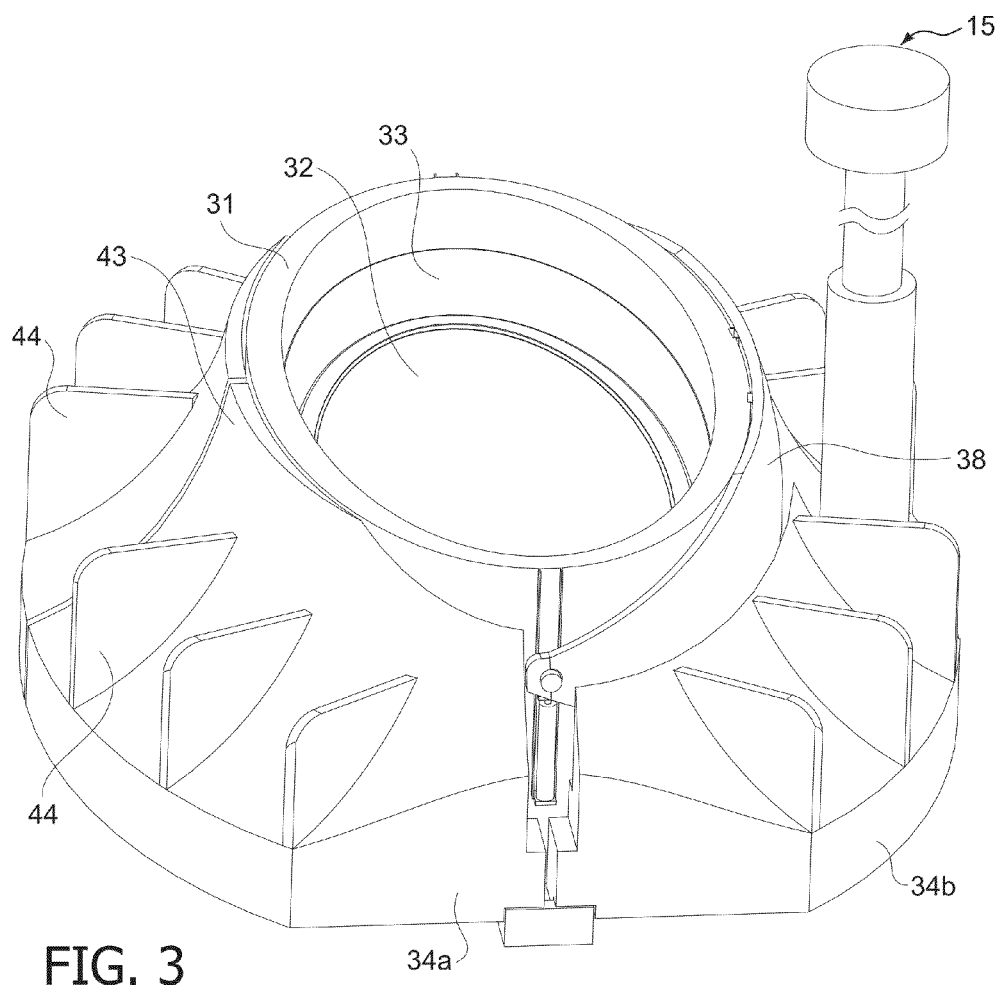
FIG. 3 is a perspective view of the WEC of FIG. 2 with parts in different positions, namely, with the piston at the lower limit of the power stroke and the deflector at its lowest position to enable sea water to be discharged into the wave trough during a return stroke.
Figure 4:
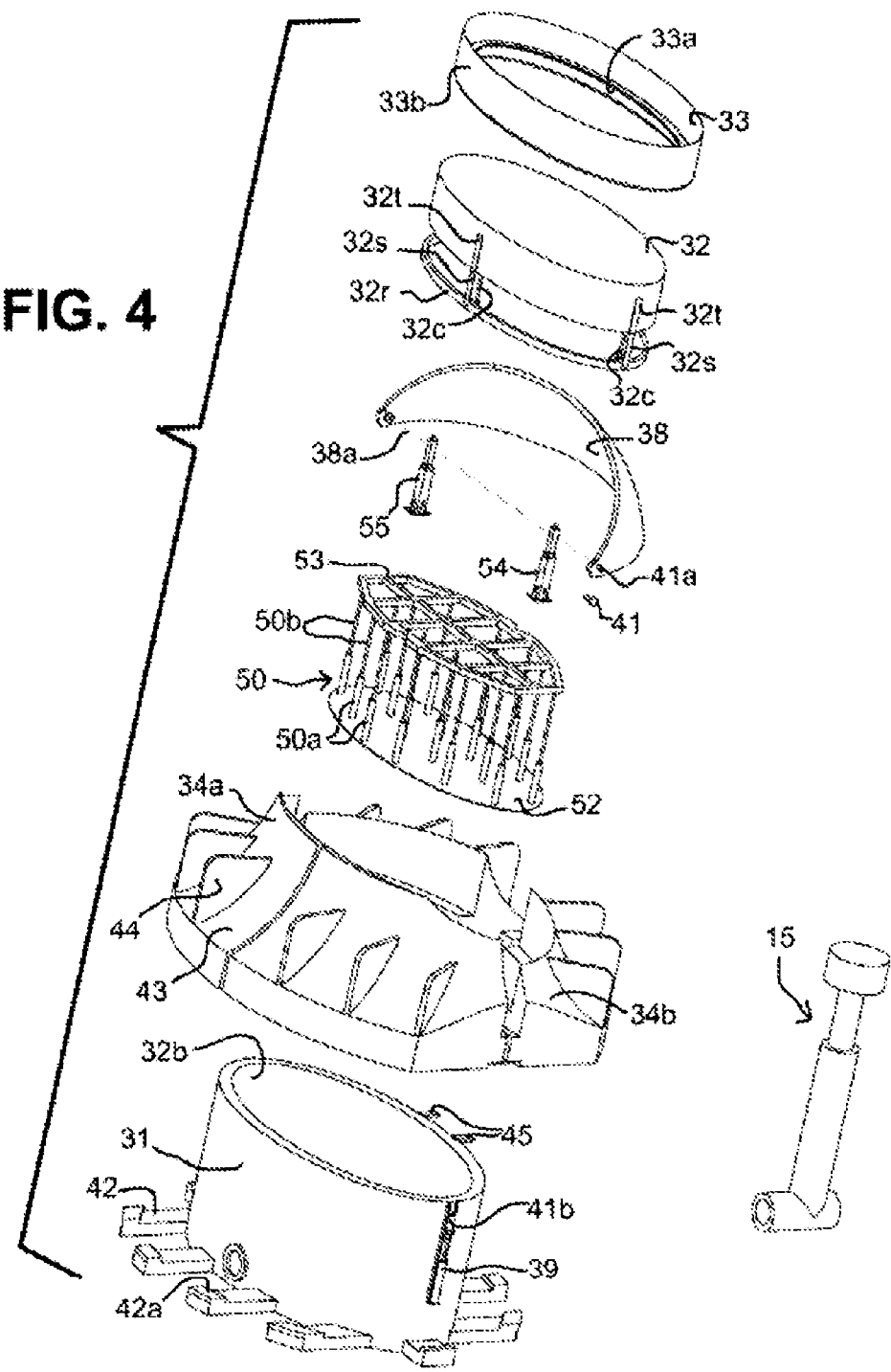
FIG. 4 is an exploded view of the WEC of FIG. 1 and FIG. 2 showing the component parts in perspective.

Aspects of an individual WEC, in accordance with the present invention, are shown in FIGS. 2-5. With reference to FIG. 4, an upright, open-topped shell 31 has an underside for resting securely on the ocean floor with the shell axis nearly vertical. After the shell is sunk to the ocean floor, a ballast of two or more parts 34a, 34b is installed on beams 42 that project outward from the lower edge portion of the shell.

Upward extending fingers 42a, at the ends of the beams 42, lock the heavy ballast pieces to the shell. Horizontal pins extending through the ballast and securely affixed to the side of the shell can also be provided. In a representative embodiment, the shell can be elliptical, with a major axis of approximately 36 feet aligned transversely to the direction of on-coming waves and a minor axis of approximately 21 feet aligned approximately parallel to the apparent direction of movement of an on-coming wave.

The overall height of the shell can be 11 feet. The shell can be reinforced concrete with components of stainless steel or another suitable alloy or rigid, durable material, resistant to erosion by seawater, cast into the concrete where other components are fitted to the shell. The ballast pieces can be reinforced concrete and, accordingly, weighty enough to stably anchor the shell to the ocean floor. Such dimensions are for illustrative purposes only, and the WECs can be scaled differently, but preferably are large for significant power production in a relatively simple design.

Figure 5:
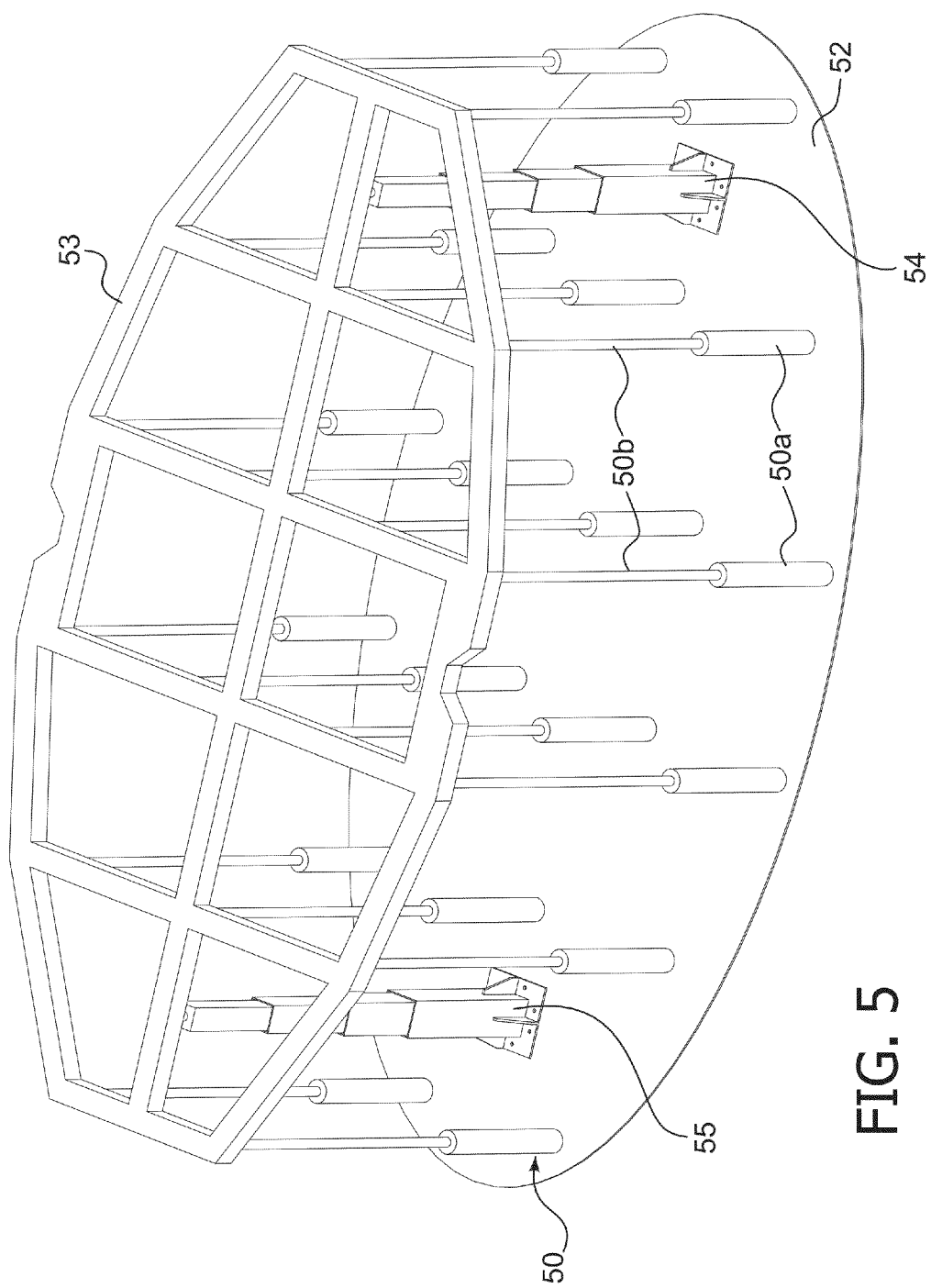
FIG. 5 is a perspective view of components of the WEC of FIGS. 1-3, namely, an assembly of hydraulic cylinders underneath the piston.

Still referring to FIG. 4, a horizontal base plate 52 is fixed to the inside bottom of the shell 31. An array of hydraulic cylinders 50 is supported on the base plate. For example, the cylinders can include the usual bodies 50a and telescoping rods or plungers 50b. The upper ends of the plungers are connected to a structural framework 53. As seen in FIG. 5, up-and-down movement of the framework is guided by telescoping columns 54, 55 having bottom ends fixed to the base plate 52 and top ends secured to the framework 53. Two such telescoping guide columns are shown in FIG. 5 but four or more may be supplied to maintain the structural framework 53 in alignment with the base plate without unduly stressing the plungers or rods of the hydraulic cylinders.

Returning to FIG. 4, the piston 32 is a cup-shaped member inverted within the shell 31, over the structural framework 53. The piston 32 fits closely over the framework and fairly close within the shell 31. The underside of the piston is secured to the top of the framework. The piston has a peripheral skirt portion that extends down along and past the periphery of the framework. A lower ring 32r is spaced below the bottom edge of the piston skirt and is connected thereto by collapsible pneumatic cylinders 32c, thereby adding to the apparent depth of the piston skirt.

Vertical slats 32s extend upward from the ring 32r and are slideable along the outside of the piston skirt. While two such slats 32s and pneumatic cylinders 32c are shown, preferably they are spaced more closely together around the circumference of the piston, such as every foot or so. In a representative embodiment, the stroke of the piston 32 is limited to about twice the vertical dimension from the top of the piston to the bottom of the ring 32r and about ⅔ the depth of the shell 31. A rollable annular seal 33 is connected between the piston and the interior 32b of the shell. An inner lip portion 33a of the seal has a peripheral edge secured to the top of the piston, and an outer skirt portion 33b of the seal is secured to the inner wall of the shell at the location corresponding to the bottom most position of the piston. The fit of the seal is water tight such that seawater is not introduced into the shell below the piston. The flexible seal material rolls up as the piston shifts upward and unrolls as the piston moves down. Slats 32s help prevent the flexible seal from entering the space below the piston as it moves up.

A vent 15 attaches to the side of the shell to serve as a hydraulically adjustable snorkel. The snorkel can have telescoping parts so that its height can be adjusted depending on wave conditions, such as by an internal hydraulic jack. Movement of the piston 32 causes air below the piston in the chamber of the cylinder assembly to communicate with the atmosphere through the top of the snorkel.

The flexible seal can be manufactured from reinforced flexible but watertight fabric formed over a mold. The dimensions of the annular seal are fully described by measurements of the major and minor axis of the piston and of the shell, and the length of the piston skirt by the distance from bottom of the stroke to the top of the shell. The piston is preferably fluted to enable the annular seal to fit wrinkle-free against the piston as the outer side of the seal rolls into contact with the piston under pressure from sea water as the piston moves up in a return stroke. The fluting can be of a form that comprises a hollow channel that covers the top of the aforementioned slats.

The WEC includes an arcuate deflector 38 that can be moved to a position to direct incoming waves downward toward the piston. The deflector can be lowered alongside the shell so as not to interfere with expulsion of sea water from the shell as the piston is moved upward. To position the deflector, hydraulic cylinders 39 are mounted on opposite ends of the shell, and corresponding ends of the deflector are pivoted on the reciprocating plungers or rods of the cylinders, such as by pins 41 extending through holes 41a. Additional control cylinders 45 are mounted on the exterior of the shell near the minor axis and at the same side, which would correspond to the side away from an incoming wave. The central portion of the arc of the deflector is carried by the reciprocating plungers of hydraulic cylinders 45. Operation of cylinders 39 and 45 can be coordinated to translate the deflector upward and also rotate it somewhat fore and aft around the axis 38a defined by the holes 41a and pins 41. As described in more detail below, operation of the four hydraulic cylinders is under computer control for raising and tilting the wave deflector so as to capture wave energy and direct it downward during a power stroke, and retract the deflector during a return stroke.

FIG. 2 illustrates the WEC 10 with parts assembled and with the curved deflector 38 raised and tilted forward in preparation for a cresting incoming wave. The piston 32 is fully raised adjacent to the top of the vertical shell 31. The hydraulic cylinders 39 at the sides have their rods extended to lift the deflector. The rear cylinders (the upper ends of which are represented at 45 in FIG. 4 but are not shown in FIG. 2) are raised to tilt the deflector forward. The surface 43 of the ballast piece 34a, which faces the incoming wave, is concave with upright fins 44 to assist in directing the wave along the ballast surface and toward the raised deflector. The overall result is to increase downward pressure of the cresting wave on the piston as the wave passes over.

In the position of FIG. 3, the deflector has been lowered and tilted down along side the shell opposite the direction of wave approach. FIG. 3 represents the lower most position of the piston 32. From that position, at or near alignment with a wave trough, the piston moves upward to expel water at approximately the location of the trough.

Hydraulic System

FIGS. 6-9 are schematic representations of hydraulic fluid energy conversion equipment of a wave energy conversion system 210 in accordance with the present invention. Piston 252 (shown diagrammatically) corresponds to the WEC piston described previously. All hydraulic cylinders driven by such piston are represented as a single cylinder 221, with an internal volume 255 for hydraulic fluid. Such volume within the cylinder decreases as the piston moves down and increases as the piston is moved up, pressurizing fluid on the down stroke and reducing pressure on the up stroke. An inlet-outlet port at the bottom communicates with the fluid conduit 201, which leads to a valve 211. After valve 211, the conduit branches, one branch leading along a conduit 202 through a valve 215 and to inlets of hydraulic motors 511, 512 of known design. Such motors have a common shaft 513 that drives the electric generator 510. Returning to valve 211, another branch from the conduit 201 leads to a two position fluid valve 214, which can be referred to as a boost/reduce switch. In the position indicated in FIG. 6, such switch directs flow through a conduit 203 to a motor 222. From the motor, the fluid flows through a conduit 204 and a flow transducer 212, then through a conduit 205 to a low pressure accumulator 224. In this condition, the low pressure accumulator 224 is also receiving fluid from the outlets of the hydraulic motors 511, 512. At the same time, output shaft 227 of the motor 222 drives an upper motor 223 operating in regenerative mode so that it functions as a pump. The inlet of regen motor 223 receives fluid from the cylinder 221 through another branch 202a and boosts the pressure at the outlet and into an outlet conduit 206, then through a flow transducer 213, conduit 207 and into a higher pressure accumulator 225.

A control computer 231 monitors pressure and displacement, flow to and from the cylinder assembly 221, accumulators, and through motor and pump units 222, 223—connecting conductors are shown here bundled in a shrink-wrap cable 232. All hydraulic motors are fully controllable electrically and are equipped with pressure sensors at inlet and outlet ports, double swing swash-plate fluid displacement actuators with position sensors, and shaft speed indicators (for example, represented at 227a in FIG. 6). During the power stroke, a signal from a flow transducer integral with valve 211 shown here as a single device on the fluid line of the cylinder assembly is used by the computer to control fluid flow and piston speed during the power stroke (power stroke being represented by the arrow 251). Hydraulic fluid flow is biased in favor of boosting pressure through the fluid power transformer (motors 222 and 223), where receiving-end pressure is about the same as the sending-end pressure. This avoids pressures being unbalanced and there being no flow, which would effectively freeze the piston in power stroke or return stroke.

During the power-stroke, shown in FIGS. 6 and 7, the force of the wave presses down, as indicated by arrow 251, on the piston 252 and into the cylinder assembly 221 which is schematically represented as a single cylinder and rod or plunger. The internal pistons 254 force fluid from the interior volume 255 into the fluid line 201. In the case where the pressure of the high pressure accumulator is higher than the pressure from the cylinder assembly, the computer sets the boost/reduce switch 214 to "boost", connecting flow pipe 201 to 203 and designates the lower motor 222 as driving motor, as represented in FIG. 6. The computer adjusts the displacement setting to provide power for the motor by drawing from the cylinder assembly and discharging to the low pressure accumulator 224. The pumping is done from the cylinder assembly to the high pressure accumulator 225 by the second motor 223 put in regenerative mode by computer control of the displacement setting on the second motor 223.

When the pressure of the high pressure accumulator is lower than the cylinder assembly, the computer sets the boost/reduce switch 214 to "reduce" thereby connecting flow pipe 206 to 203 and designates the upper motor 223 as the driving motor, as shown in FIG. 7. In the "reduce" position, the motor inlet is connected to the cylinder assembly 221 through pipe 201 and the motor outlet to the high pressure accumulator 225. Simultaneously the computer switches the displacement setting of the second motor 222 to regenerative mode to cause it to pump fluid from the low pressure accumulator 224 to the high pressure accumulator 225. In summary, the two fluid switching states for the power-stroke are identical except for the position of the fluid boost/reduce switch 214.

At the end of the power stroke, valve 211 is closed, thereby effectively "locking" the piston in the lower-most position. Also, an electric brake 227b is set to lock the common or connecting shaft 227 of motors 222, 223. Then, as the wave trough approaches, the system is set for the return stroke, represented in FIG. 8 and FIG. 9.

During the return-stroke, the brake 227b is released and the force from the cylinder assembly 221 is pressing up under the piston 252, as indicated by arrow 261, to discharge seawater from the shell. In the case where the pressure of the high pressure accumulator 225 is lower than the pressure from the cylinder assembly 221, the computer sets the boost/reduce switch 214 to "boost", and designates the lower motor 222 as the driving motor, as shown in FIG. 8. The inlet of motor 222 is connected through pipe 203 and boost/reduce switch 214 to pipe 206 and to the high pressure accumulator 225, and the motor outlet is connected through pipe 204 and 205 to the low pressure accumulator 224. The power of motoring is used to drive the second motor 223 in regenerative mode. The regenerative motor 223 displacement is simultaneously switched to pump fluid from the high pressure accumulator 225 to the cylinder assembly 221. The boost/reduce switch 214 is shown to be on the same side as that shown in FIG. 7, which reflects the change of view of the fluid flow through the switch from power-stroke "reduce" to return-stroke "boost".

During the return stroke, if the pressure of the high pressure accumulator 225 is higher than the pressure of the cylinder assembly 221, the computer sets the boost/reduce switch 214 to "reduce", and designates the upper motor 223 as the driving motor, as shown in FIG. 9. The motor inlet is connected to the high pressure accumulator 225 and the outlet to the cylinder assembly 221. The power of motoring is used to drive the lower motor 222 in regenerative mode to pump fluid from the low pressure accumulator 224 to the cylinder assembly. The boost/reduce switch 214 is shown to be on the same side as that shown in FIG. 6, which reflects the change of view of the fluid flow through the switch from power-stroke "boost" to return-stroke "reduce".

Figure 11:
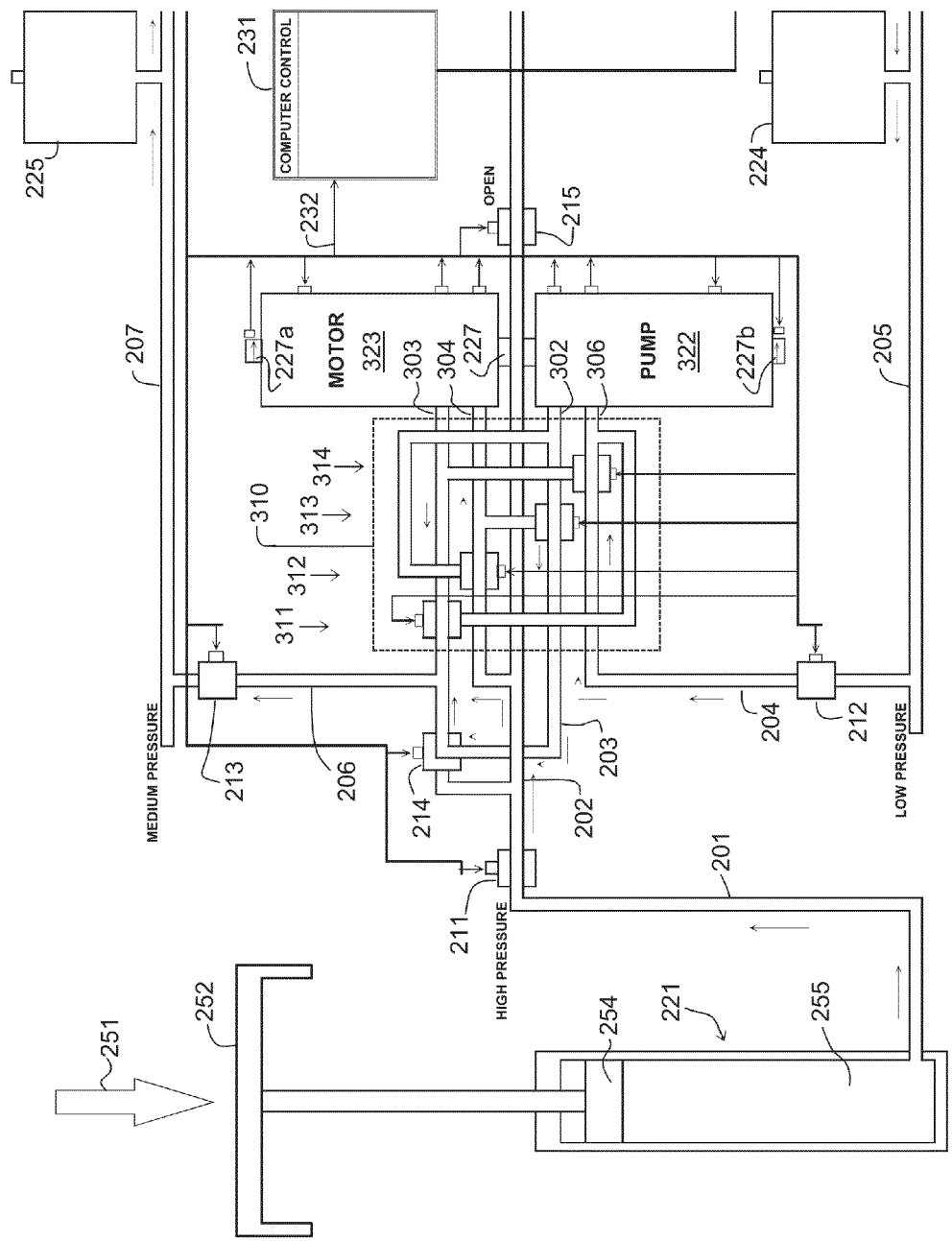
FIG. 11 is a schematic representation similar to FIG. 10 with the WEC operating in the power stroke, but with pressure from the accumulator being reduced through the fluid power transformer after passing through a fluid transposing switch.
Figure 12:
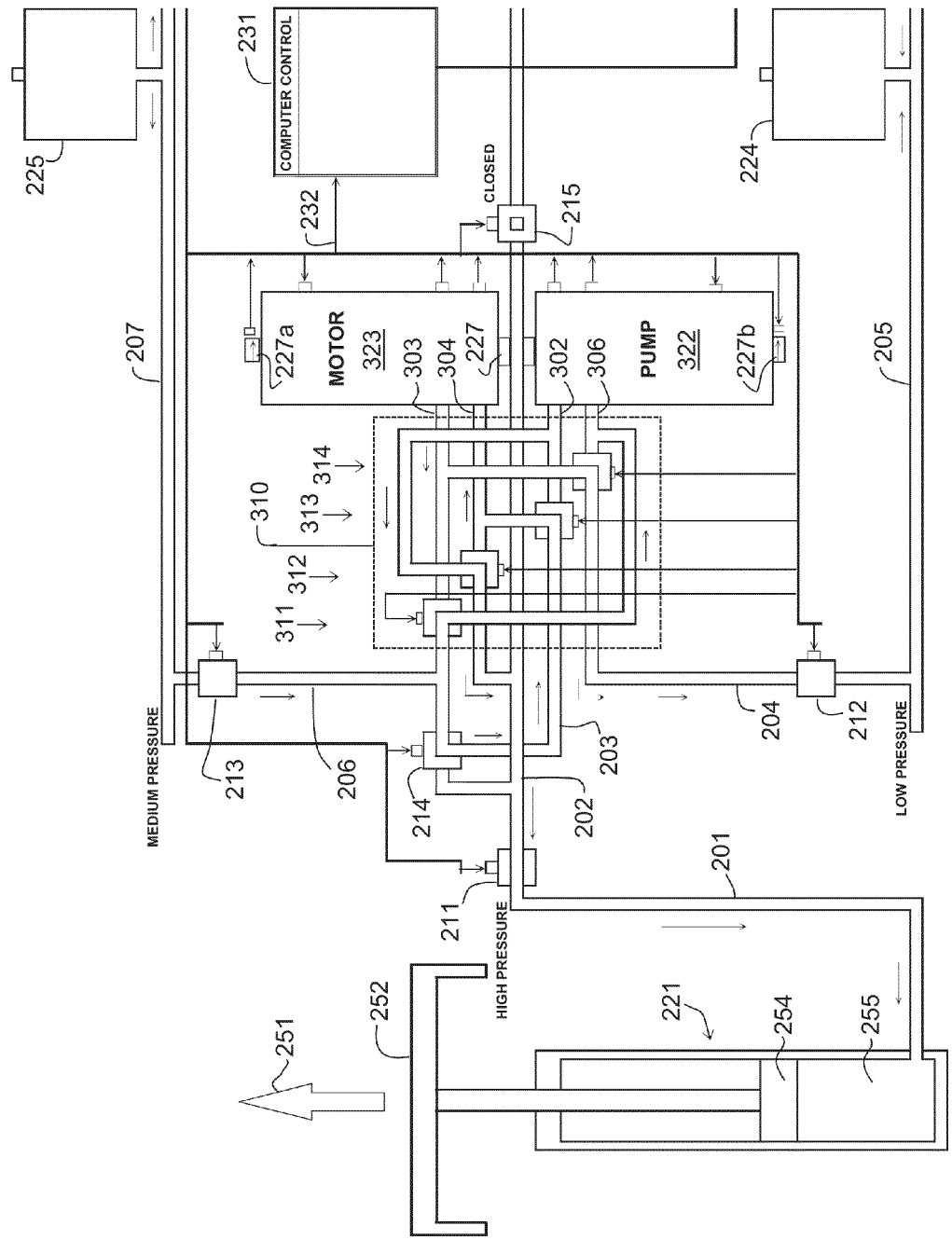
FIG. 12 is a schematic representation similar to FIG. 11 with the WEC operating in the return stroke, with pressure from the accumulator being boosted through the fluid power transformer after passing through a fluid transposing switch.

The aforementioned FIGS. 6-9 are the switching states for what is known in in this document as a Class A fluid power transformer and defined in the Terminology section where both motors 222, 223 are capable of operating in regenerative mode according to displacement set by the control computer 231. It may be preferable to use a pump in place of the regenerative motor, inter alia, a pump may be more efficient than a motor driven in regenerative mode, and to switch the pump into the regeneration motor location each time regeneration is required. In accordance with the present invention this can be done by inserting a fluid transposing switch ahead of the motor and pump as shown in FIGS. 10-13 and toggling the transposing switch (indicated at 310 in these figures and having four individual valves 311-314) such that the pump is always in the position of the regenerative motor as evidenced by comparing FIG. 10 to FIG. 6; FIG. 11 to FIG. 7; FIG. 12 to FIG. 8; and FIG. 13 to FIG. 9. The following FIG. 10-FIG. 13 show that the fluid transposing switch 310 makes it possible to use the most efficient rotating equipment available, in what is known in this document as a Class B fluid power transformer, without any loss of flexibility, functionally identical to figures FIG. 6-FIG. 9, and independent of other functions of the inventive WEC.

Figure 10:
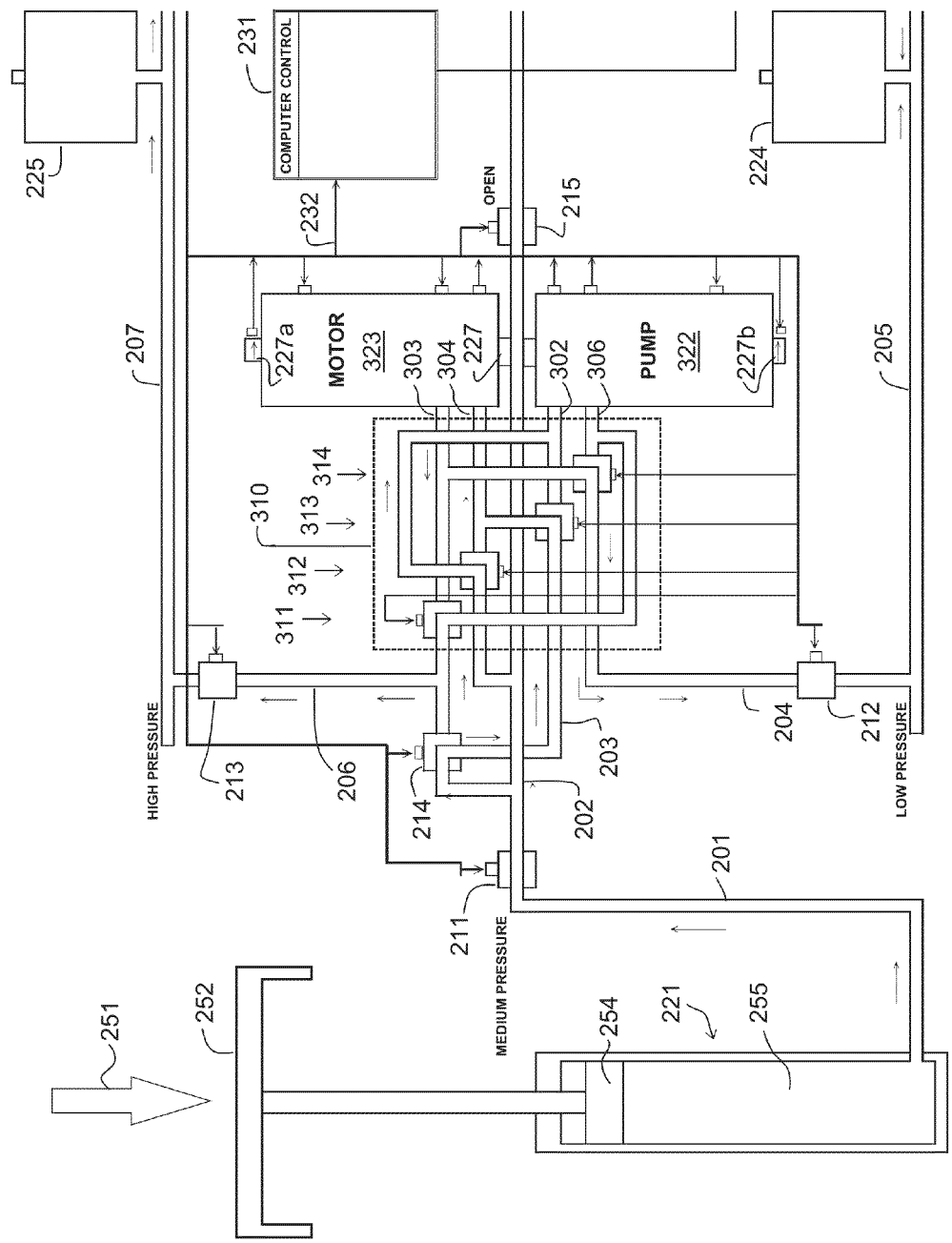
FIG. 10 is a schematic representation of a second embodiment of wave energy conversion system in accordance with the present invention, with a WEC operating in a power stroke, with pressure from an accumulator being boosted through a fluid power transformer having a motor rotatably connected to a pump, after passing through a fluid transposing switch.

It is shown in FIG. 10 that the fluid transposing switch 310 is in the transpose position. Each of the four fluid switches 311-314 are connected to transpose motor 323 and pump 322 to align with the motor and regenerative terminals to the configuration shown in FIG. 6.

It is shown in FIG. 11 that the fluid transposing switch 310 is in the straight though position and no transposition is required. Each of the four fluid switches 311-314 that make up switch 310 is connected straight through to the motor 323 and pump 322 to the configuration as shown in FIG. 7.

It is shown in FIG. 12 a transposition of switches 311-314 is required so that the motor 323 and pump 322 are in the same configuration as the motor and regenerative motor in FIG. 8.

Figure 13:
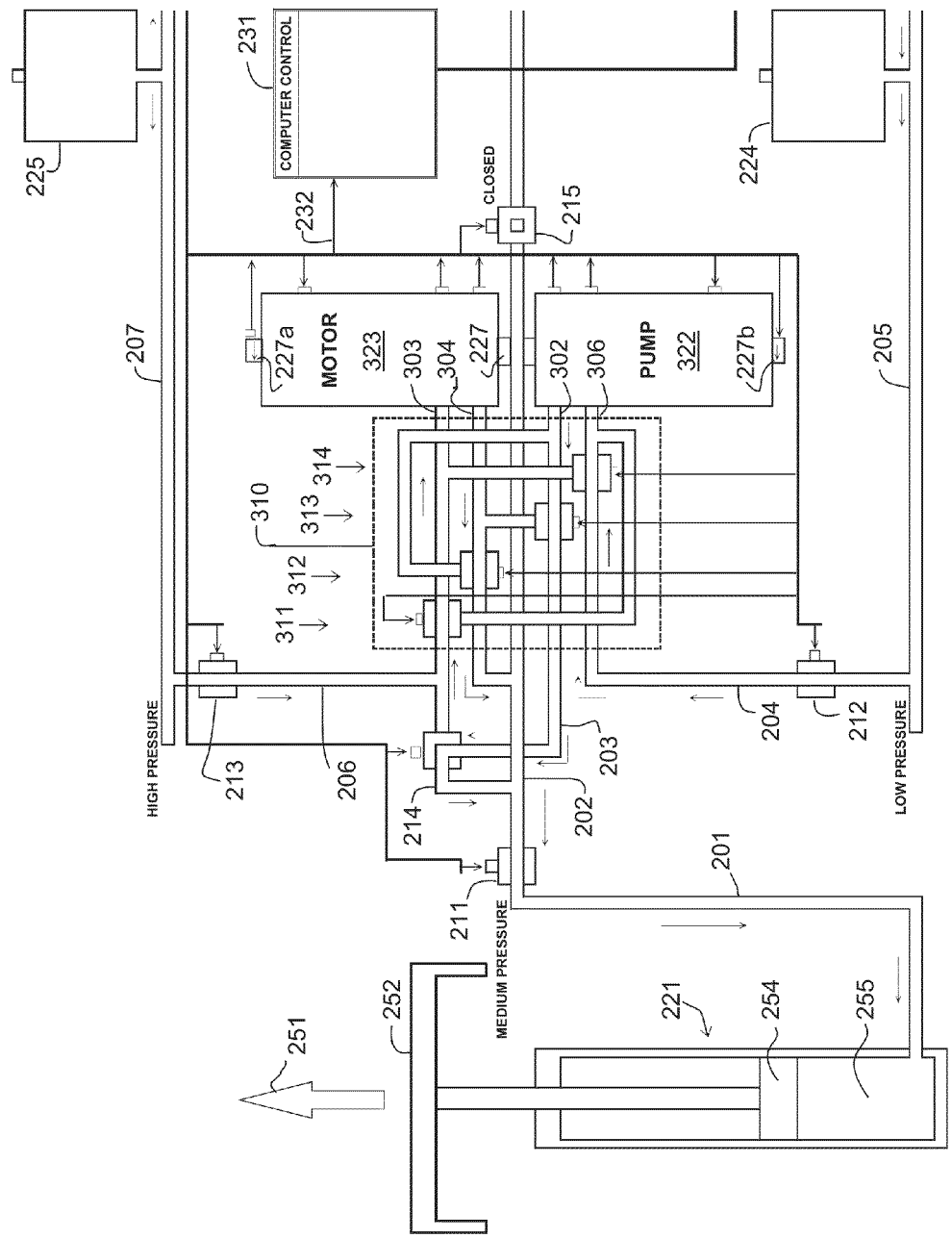
FIG. 13 is a is a schematic representation similar to FIG. 12 with the WEC operating in the return stroke, with pressure from the accumulator being reduced through the fluid power transformer after passing through a fluid transposing switch.

It is shown in FIG. 13 that no transposition is required as the motor 323 and pump 322 are in the same configuration as the motor and regenerative motor in FIG. 9.

The fluid transposition switch has an auxiliary function, that of transposition switching the electrical sensors and displacement controls for the motor and pump simultaneous with the fluid transposition. This requires a two-position double-throw switch of the requisite number of poles, plus auxiliary contacts to control the fluid transposition switch. It is preferable that this electrical switching be done entirely within the control computer, where the first part of an algorithm performs the electrical sensor and displacement control transposition, and the second part, the fluid line transposition, is done by an electrical pulse to each valve 311-314 in the fluid transposition switch 310.

It is apparent from the discussion of FIG. 6-FIG. 13 that the two inventive fluid power transformers (Class A and Class B) are functionally equivalent, and would perform equally well for the four main operating conditions, boosting and reducing pressure in the power-stroke and return-stroke. It may be preferable to reduce the low pressure accumulator 224 to atmospheric pressure reservoir 226. A two-position double-throw fluid valve switch 216 (seen in FIGS. 6-9) at the inlet to a charging pump 516 is switchable to allow the low pressure accumulator 224 to communicate through pipe 208 with the oil reservoir 226 at atmospheric pressure.

In the conversion of fluid power to electric power generation, it is preferable during the power-stroke to send about half the fluid energy directly through on-off switch 215 to the hydraulic motor that powers the electric generator and thus avoid the power transformation losses that would otherwise occur if all the energy was sent to storage and then drawn back for generation. A fluid power switch 215 inserted into the cylinder assembly line 202 is kept open for direct generation during power-stroke as shown in FIGS. 6, 7, 10 and 11, and kept closed during return-stroke as shown in FIGS. 8, 9, 12 and 13.

The generator 510 is preferably powered by two hydraulic motors 511, 512, rotatably coupled as indicated at 513, at least one of which is supplied directly from the cylinder assembly during the power-stroke through an open valve 215 as shown in FIGS. 6, 7, 10 and 11. The second motor is switchable to lead the change-over to operate from the high pressure accumulator 225 during periods of transition, which is at a different pressure than the flow from the cylinder assembly 221 via line 201. These hydraulic motors are operated at constant speed for constant frequency electric power generation. The cylinder assembly valve 215 is closed at the end of the power-stroke and fluid is then supplied from the accumulator 225 for the duration of the return-stroke and during periods of piston inactivity. The computer program has a forward looking state-estimator algorithm to estimate the steady level of power that can be produced for a particular on-coming wave condition and determines the best estimate for the power production settings. Such optimal control and optimal state estimator features are known to be programmable in state-of-art computer PLC and DCS systems.

Power is imported from the utility system on shore, or from a motor-generator set, over the under water cables to an electrical box 514 (FIGS. 6-10) to start the WEC into operation. Electrical control lines connect the control computer 231 to a computer on shore. A small electric start-up motor 515 drives a pump 516 to charge the accumulators and hydraulic equipment from a reservoir 226.

Sufficient power is imported to operate the electric motor-pump-set to charge the high pressure accumulator 225 to build up an energy reserve sufficient to run the WEC 10 through a few power-stroke return-stroke cycles and give the computer algorithms time to adjust to ocean wave conditions. After fluid energy in the high pressure accumulator 225 is considered sufficient to sustain continuous electric power production, the fluid line to the turbine is opened, the hydraulic turbines 511, 512 are started and electric generator 510 is brought up to speed and synchronized at the electrical control panel 514. Power is exported to shore by increasing turbine displacement to increase power generation.

Figure 14:
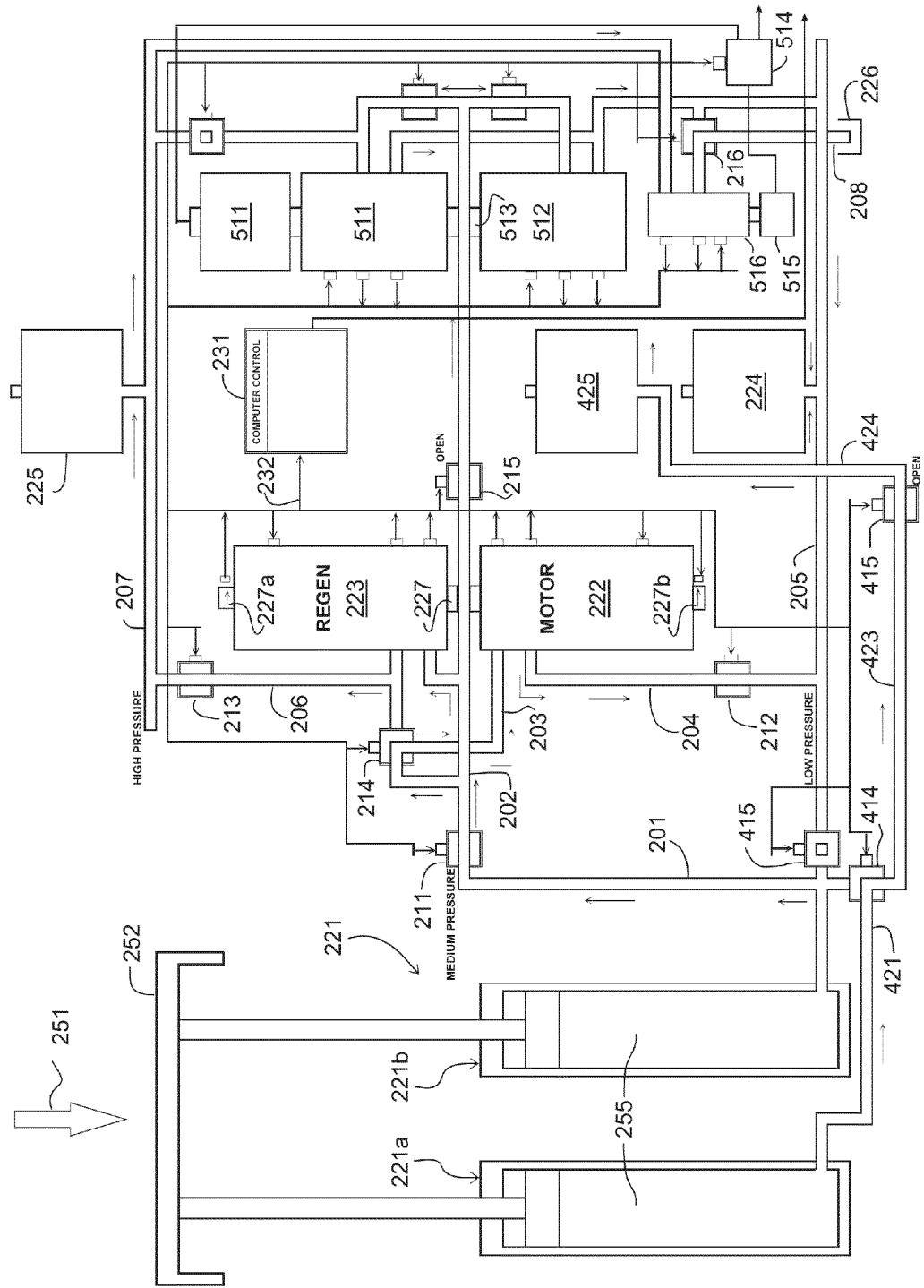
FIG. 14 is a schematic representation of a third embodiment of wave energy conversion system in accordance with the present invention, with a WEC operating in power stroke, the WEC being represented by a piston with multi-cylinder assembly below divided into two groups, each represented by a single cylinder, with one cylinder connected to transfer fluid directly to a fluid energy swing accumulator introduced in this embodiment, and with pressure from the second cylinder being boosted through the fluid power transformer and fluid flowing to storage in the high pressure accumulator.
Figure 15:
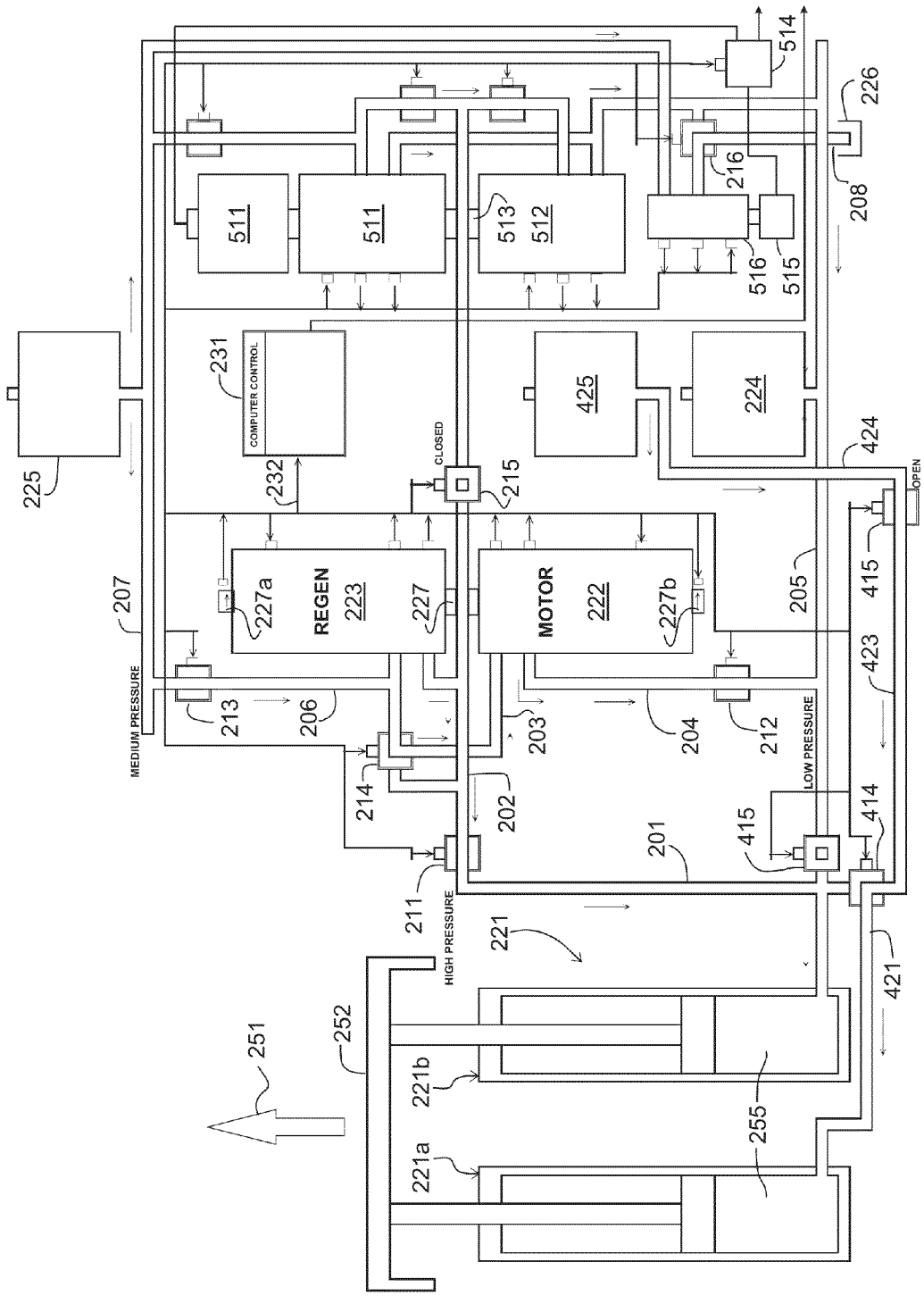
FIG. 15 is a schematic representation similar to FIG. 14, except with the WEC operating in return stroke with fluid from the energy swing accumulator acting to return the piston to its top position.

Another embodiment of fluid transfer arrangement for further efficiency enhancement, known in this document as a fluid energy swing, from the power stroke to the return stroke, is shown in FIG. 14 and FIG. 15. In the power stroke (FIG. 14), a first group of piston driven cylinders 221a communicates through line 421 to two-position fluid valve 414 and line 423-424 to a separate accumulator 425, storing energy from the power stroke to provide energy for the return stroke without incurring loses from fluid pressure transformation. The fluid energy swing is adjustable from approximately 0 to 100% of the energy required to return the piston to its top position, depending on numbers of cylinders (each with a single-pole double-throw fluid switch 414) in the group and accumulator pressure. The second group of cylinders 221b communicates through fluid line 201 to the fluid power transformer similar to that shown in FIGS. 6-13. FIG. 15 shows the conditions during the return stroke.

Figure 16:
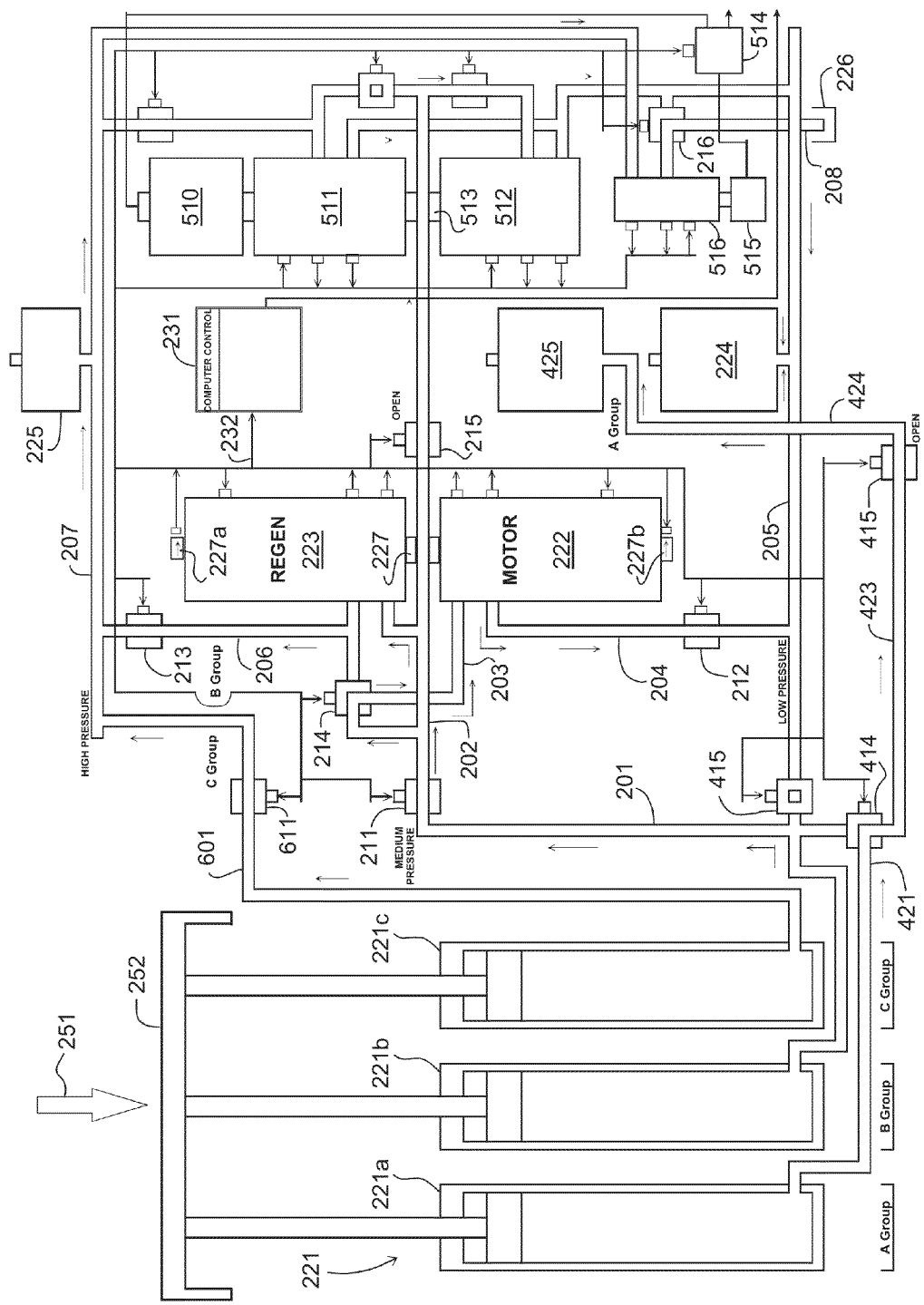
FIG. 16 is a schematic representation of a fourth embodiment of wave energy conversion system in accordance with the present invention.

The modified fluid transmission circuit shown in FIG. 16 has the assembly 221 of piston driven cylinders divided into three groups. Power stroke conditions are illustrated in FIG. 16. The first cylinder group 221a communicates through conduit 421, valve 414, conduit 423, valve 415, and conduit 424 with the additional accumulator 425. As for the embodiment of FIGS. 14 and 15, charging pressure in accumulator 425 on the down stroke can be recaptured on the return stroke. A second cylinder group 221b communicates with the fluid pressure transformation pair 222 and 223, similar to the embodiments of FIGS. 6-13. A third cylinder group 221c communicates directly with the high pressure accumulator 225, i.e., by way of line 601 and valve 611 to line 207, so as to transfer fluid directly to such high pressure accumulator. Thus, the first group 221a functions independent of wave action as if the piston is simply translating up and down, pressurizing the additional accumulator 425 on the power stroke and using this pressure on the return stroke. The third group 221c operates as a base load group where fluid pressure is transmitted directly to the high pressure accumulator on the power stroke without using the pressure transformation motor-pump pair 222, 223. The second group 221b is a residual flow group which transmits the balance of the energy in the ocean wave, some of which goes directly to drive electricity generation through line 202 and valve 215 (valve 215 being open during the power stroke and closed at other times).

Figure 17:
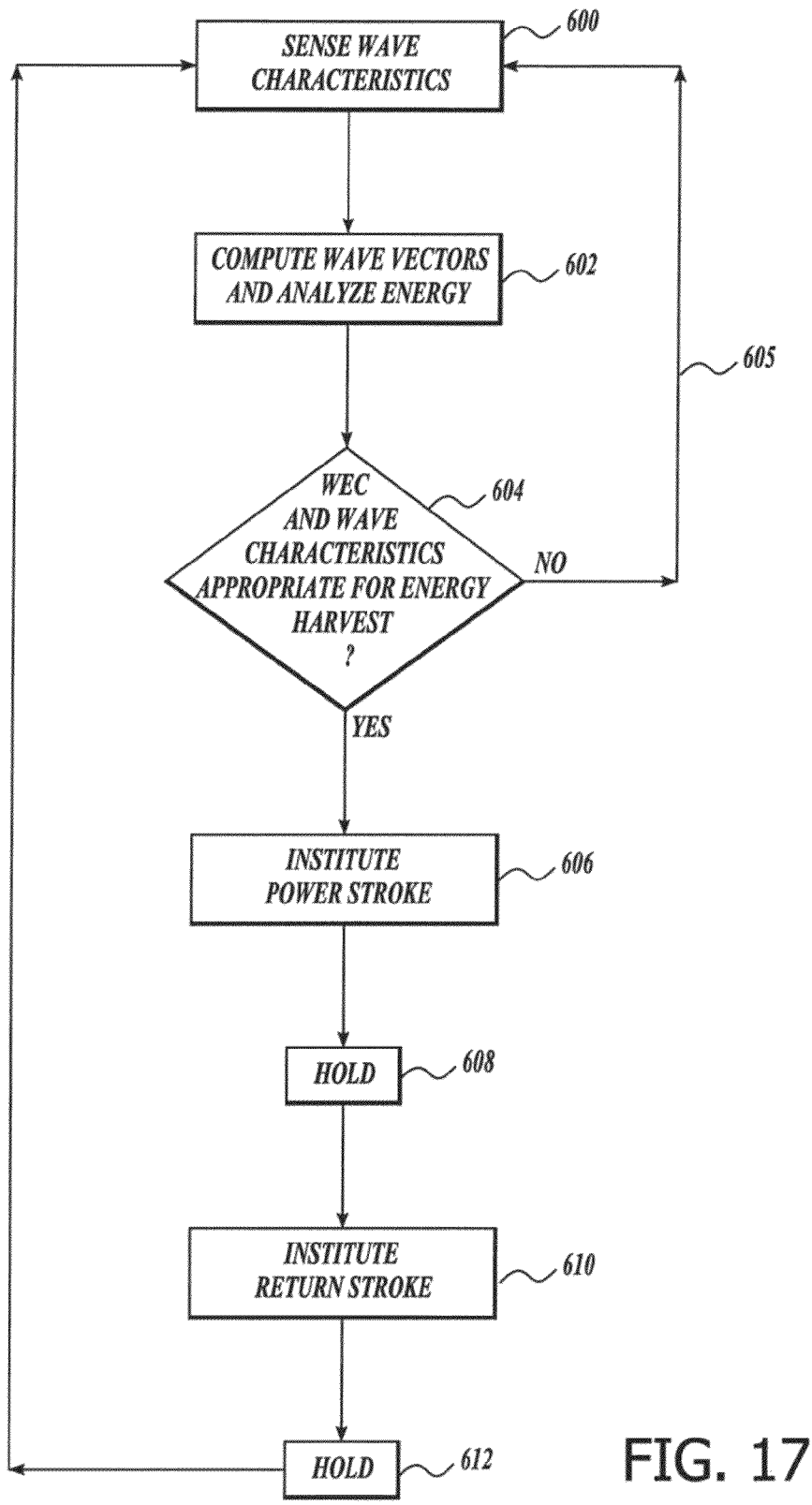
FIG. 17 is a flow diagram of operation of a wave energy conversion system in accordance with the present invention.

A simple flow diagram of operation of all embodiments of the wave energy conversion system in accordance with the present invention is shown in FIG. 17. The sensor array positioned seaward of the WECs detects wave characteristics as indicted at box 600. The control computer reads data from the sensors and computes the wave vectors and analyzes the useful energy of the on-coming wave, as indicated by box 602. The control computer then evaluates the operating characteristics of the WEC and, in combination with the wave characteristics calculated from the sensor data, makes a decision as to whether or not the on-coming wave is appropriate for energy harvest. If not, no additional action is taken and the next wave is analyzed, as indicated by line 605. On the other hand, if it is determined that the wave is appropriate for energy harvest based on its energy and the operating condition of the WEC, the power stroke is instituted (box 606) and continued to the optimal lower most position of the piston. For example, for a representative wave train the WEC deflector may be raised and tilted to its energy capturing position at approximately 10 to 30 ocean-wave-degrees prior to alignment with the wave crest. At the end of the power stroke, the WEC is returned to a "hold" condition with the main supply valve closed and the electric brake 227b applied (box 608), until the appropriate time for instituting the return stroke (box 610), which could occur for example, at 10 to 30 ocean-wave-degrees prior to the wave trough passing over the WEC. Between the end of the power stroke and the beginning of return stroke, the deflector is lowered so as not to interfere with expulsion of seawater from the WEC. At the end of the return stroke, the system again is placed in the "hold" condition (box 612; electric brake 227b applied and main supply valves closed) and the system recycles to analyzing the next on-coming wave.

The aforementioned drawings and discussion have been simplified to assist in comprehension with some details omitted for brevity. A WEC operates continuously when waves are favorable, making it cost-effective to apply high efficiency hydraulic equipment and computer technology to the maximum extent possible. It is known that it is preferable, for greatest efficiency and flexibility, that for optimal state estimation all possible parameters be measurable (accessible and observable) to formulate the computer model for optimal computer control. A comprehensive computer model includes motor speed and fluid displacement indicators, fluid pressure and metering sensors, and fluid valve position indication at all possible points of measurement. It is known good practice for example, that auxiliary contacts on electrically operated devices such as fluid valves in this case, ensure that the devices have responded as required and are in the required position; and to include flow measurement. The hydraulic motors and pumps are preferably the full-range reversible type, actuated with electronic signals, with displacement indicators. The computer on board the WEC is subordinate to a master computer on shore, allowing the master computer to log, review and improve the performance of the slave.

The wave energy conversion system in accordance with the present invention is essentially a computer controlled wave energy harvesting device that relies on a state estimator model of an incoming wave, as determined from pressure transducers on the ocean floor, to set the strategy for the harvesting of each wave cycle. The WEC's, forward looking, discrete switching synchronizes itself to the waves coming on shore, and adjusts itself to harvest only those waves with energy above a predetermined threshold.

The system of the present invention lends itself to use for creating waves for recreational purposes in addition to harvesting waves for energy generation. In the case of wave creation, energy for operating the WEC piston comes from shore. If small recurring waves are present, the WECs are positioned and timed for expelling water upward and, if deflectors are used, shoreward in a calculated sequence that progressively increases wave height and volume. The principles are the same but the energy flow is opposite. When starting a wave in a calm sea, calculation can be based on creating an imaginary horizontal drum of water and setting it in rotation toward the shore, slowly accelerating it in a forward direction. As the imaginary drum passes over a series of WECs, the pistons are reciprocated so as to create a longer drum or wave front with additional rows of WECs similarly configured.

Briefly, an alternative configuration to that of the first wave device 10 shown in FIG. 1 is disclosed in FIGS. 20 to 24. This alternative configuration can be considered as a value-engineered cost-reduced apparatus for the application of wave energy conversion shown in FIG. 1. Wave devices 10 are replaced with wave devices 800, which similarly rest on the ocean floor 20, except the actuator 804 is secured with a footing with a support 805. The waves 22, peak 26, and trough 27, is common to the alternatives. The control computer 231 and the utility electrical connection with the hydraulic system is located near the shoreline 21 in element 24. Elements 11, 12, 15, and 16 are eliminated in the alternative configuration. The electrical control cables and hydraulic lines 806 and 806 serve the function of cables 23 in the first alternative.

The application of the fluid power transformer to a WEC-Type-II wave energy converter as shown in FIGS. 20 to 24, includes two double-acting helical hydraulic rotary actuators 802, 804 for manipulating each wave deflector 801. The inventive transformer can be applied in multiplex mode to incrementally actuate the deflectors 801 in a manner appropriate to the application.

When the WEC-Type-II device 800 is applied to wave making, waves 22 move from right to left, the deflector actuators 802, 804 operate in motoring mode in quadrant Q1, rotating in a CCW direction in steps of FIGS. 21 to 24, when viewed looking into the page.

Figure 21:
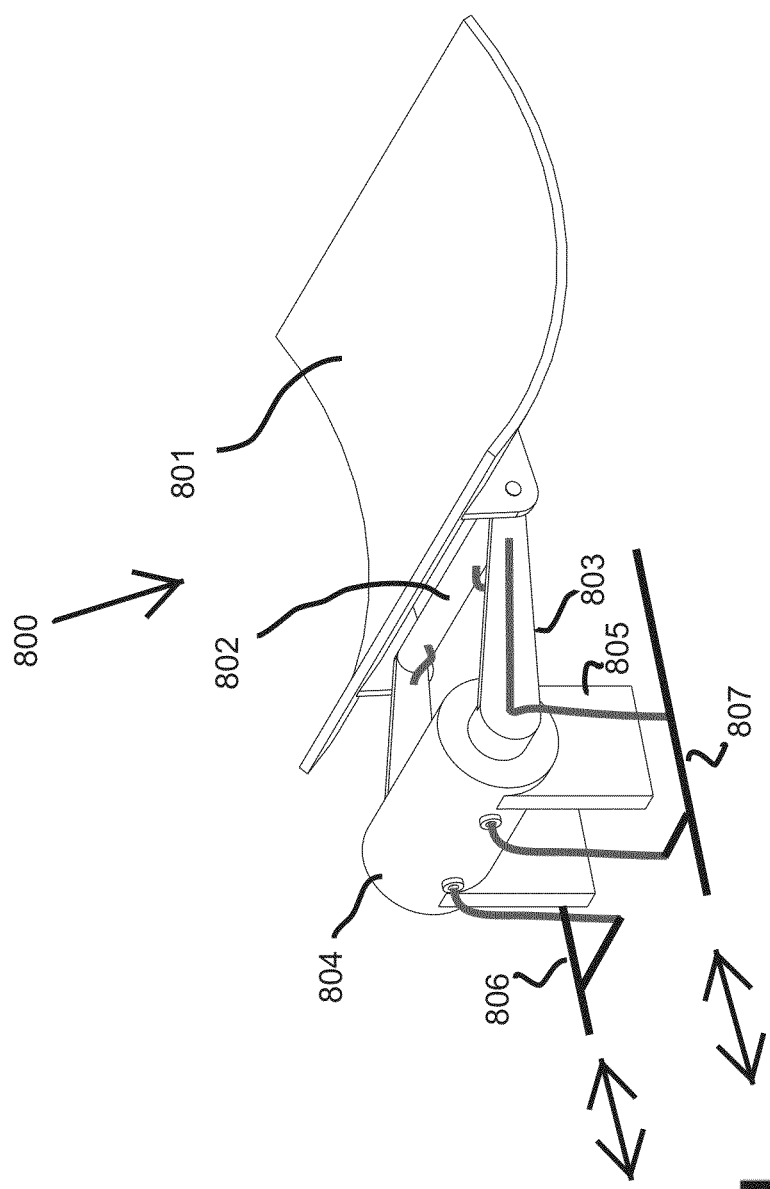
FIG. 21 is a perspective view of single wave energy converter of the embodiment of FIG. 20, in a first position.
Figure 22:
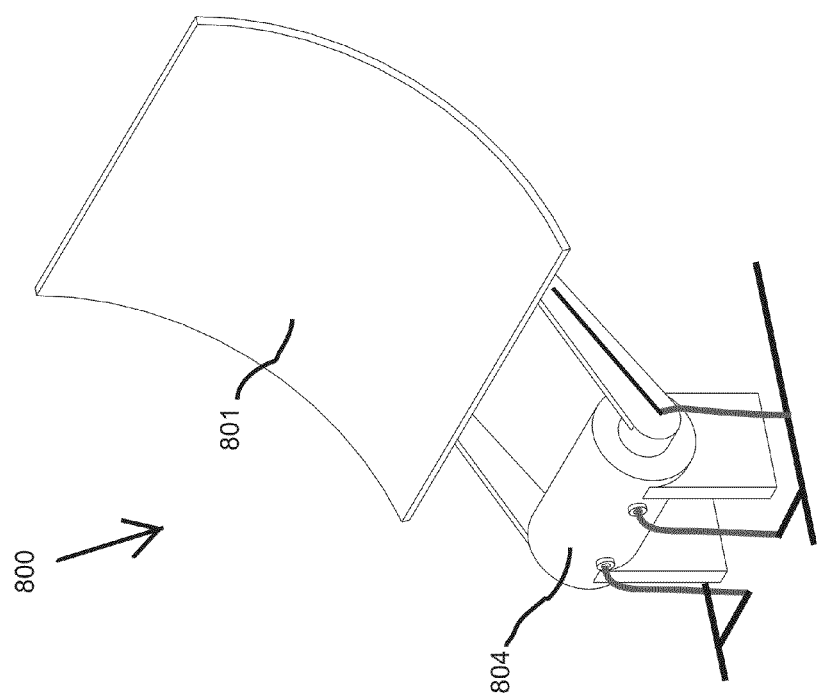
FIG. 22 is a perspective view of the embodiment of FIG. 21, in a second position.
Figure 23:
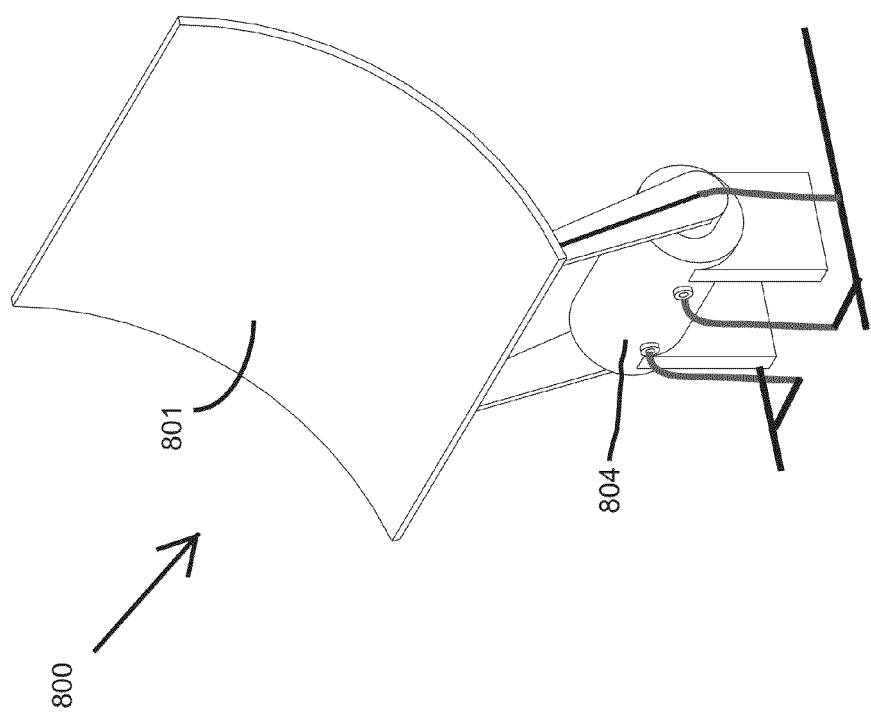
FIG. 23 is a perspective view of the embodiment of FIG. 21, in a third position.
Figure 24:
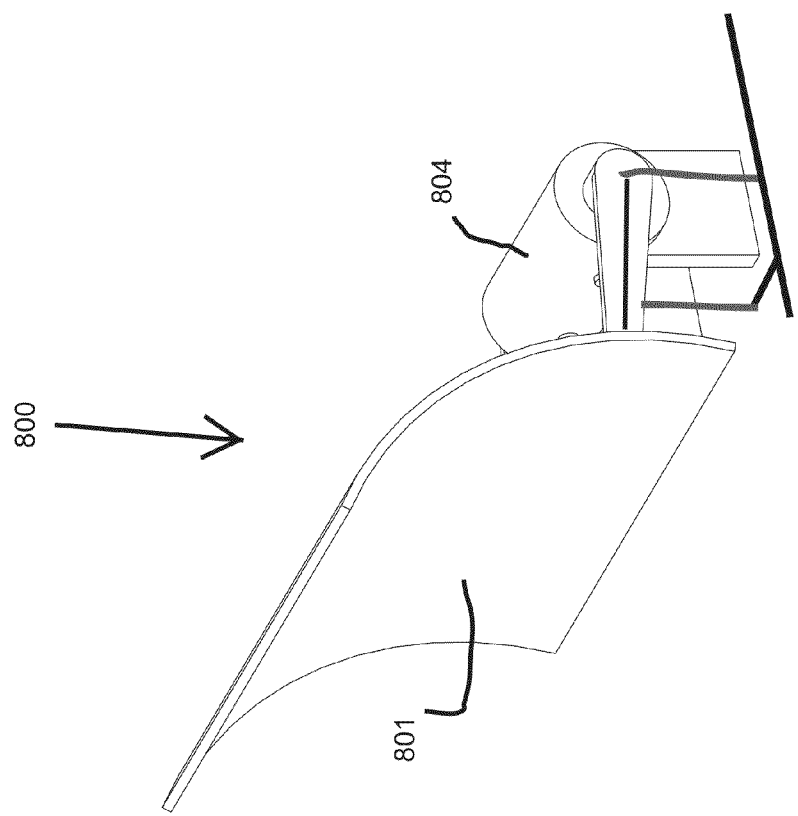
FIG. 24 is a perspective view of the embodiment of FIG. 21, in a fourth position.

During the trough 27 of a wave 22 the actuators 802, 804 operate in motoring mode in quadrant Q2, rotating in a CW direction to reset the deflector 801 and move to a rest position shown in FIG. 21, also known as the first position, for the next wave crest 26 to pass over.

Figure 20:
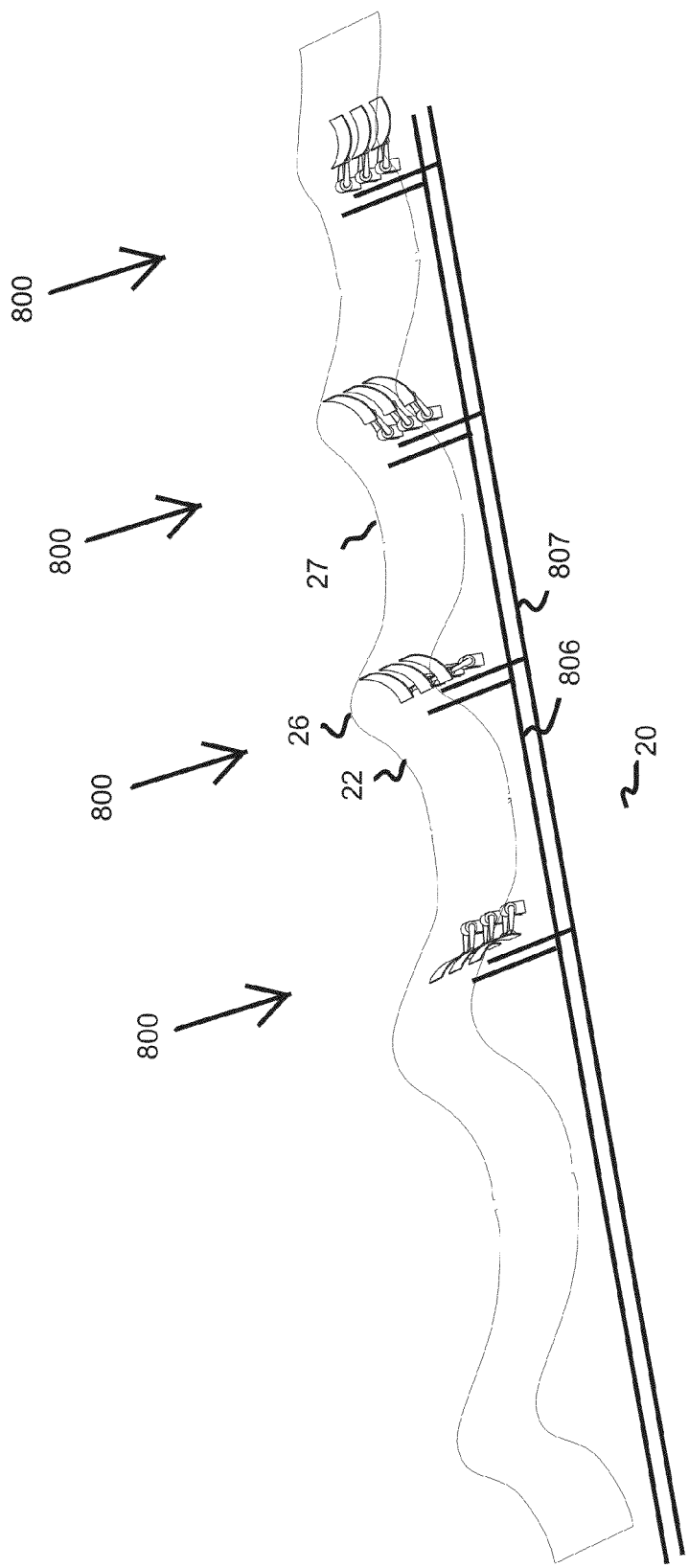
FIG. 20 is a perspective view of components of a wave energy conversion system with parts shown diagrammatically, on the ocean floor near shore, in accordance with the present invention showing a multiplicity of wave energy converters of a second embodiment (WEC-Type-II) employing known helical-hydraulic actuators, connected by fluid and electrical control lines laid on the sea bed to a controller and to utility on shore.

When the WEC-Type-II device is applied for electric power generation where waves 22 move from left to right, several wave energy converter devices 800 as shown in FIG. 20, are operated together. The transformer can be applied in multiplex mode to sequently, incrementally step through the actuation of the deflector of each converter. The process of multiplexing fluid flow from a single transformer to two rotary actuators 802, 804 is apparent when considering a single WEC-Type-II wave energy converter 800 moving in small increments through the positions shown in FIGS. 21 to 24.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for converting energy from recurring ocean waves, said system comprising a wave energy converter and a control computer, said wave energy converter comprising:

(a) a shell (31) having an elliptical inner surface (32b) about an upright center axis, with a closed bottom end, fixed with relation to the ocean floor (20), and a top end open to the sea above;

(b) a converter piston (32) co-axial within the shell (31), moveable down (251) and up (261) therein, and defining a gas filled chamber (221) between an underside of the piston (31) and the inner bottom of the shell (31), the chamber including a vent (15) to atmosphere;

(c) a ballast (43), for securing the shell (31) to the ocean floor (20), of two or more parts (34a,34b) surrounding the shell (31), with a concave surface (43) which faces the incoming wave, directing water flow from along the ocean floor upward to the shell (31) opening and with a reaction force further pressing the shell (31) to the ocean floor (20);

(d) an arcuate deflector (38) positioned adjacent to the shell (31), rotatable about a main axis (38a) through its end points (41a), the axis in parallel with the major axis of the ellipse of the shell (31) and in close proximity to or intersecting the upright center axis of the shell (31), for turning horizontal wave force downward onto the piston (32), the arcuate deflector (38) hydraulically actuated between a position at least partially overlying the piston (32) and a position not overlying the piston (32), based on the positions of significant wave crest (26) and wave trough (27);

(e) a flexible rollable annular seal (33) between the inner surface of the shell (32b) and the piston (32), the seal (33) being secured to keep sea water out of the chamber below the piston, the piston (32) being moveable axially in the shell (31) in response to variations in water pressure on the piston (32) as ocean waves pass over;

(f) an assembly of hydraulic cylinders (50)(221) below the piston (32)(210) and connected thereto so as to pump fluid through a hydraulic fluid system as the piston (32) reciprocates with waves (22) passing over, downward movement under weight of the crest (26), and upward movement by hydraulic force under the trough (27), the hydraulic fluid system including a high pressure accumulator component (225), a low pressure accumulator component (224) and a fluid power transformer component characterized by a fluid piping network, including a two-position fluid switch (214), a first motor (222) rotatably coupled to a second motor (223), each motor being operable in regenerative mode under power of the other motor, all of said components being connected to communicate fluid with the cylinder assembly (221);

(g) a means for converting energy in the hydraulic fluid system to electric energy;

(h) a means for sensing (25) physical features of on-coming waves (22) offset seaward from the wave energy converter(s) (10); and (i) a control computer (231) being programmed to control operation of the wave energy converter (10) including the arcuate deflector (38), the fluid power transformer (222) (223), and the means for converting hydraulic energy to electric energy (510) (511) (512), as a function of the wave features sensed.

2. The system of claim 1 in which the hydraulic fluid system includes accumulators (225) (224) connected so as to be pressurized as the piston (32) reciprocates and connected under control of the control computer (231) to supply fluid under pressure to a hydraulic motor(s) (511) (512) driving an electric generator (510) at substantially constant output power throughout the wave cycle.

3. The system of claim 1 wherein said fluid power transformer component includes a two-position fluid switch (214), a four-element two-position fluid transposition switch (310), a motor (323) rotatably coupled to a pump (322), all connected to communicate fluid with said cylinder assembly (221) and means for converting fluid energy to electric energy.

4. The system of claim 3, wherein said hydraulic fluid system includes said cylinder assembly (50) (221) particularly divided into at least two groups of cylinders (221a) (221b), a first group (221b) with means for fluid energy exchange by way of the fluid power transformer with the high pressure accumulator (225) and the low pressure accumulator (224), and a second group (221a) with means for further fluid energy exchange with another accumulator (425) directly without rotary hydraulic motors or pumps.

5. The system of claim 1, which includes said cylinder assembly (50) (221) particularly divided into at least three groups of cylinders (221a) (221b) (221c), a first group (221b) with means for fluid energy exchange by way of the fluid power transformer with high pressure accumulator (225) and the low pressure accumulator (224), a second group (221a) with means for further fluid energy exchange with another accumulator (425) directly without rotary hydraulic motors or pumps, and a third group (221c) with means for further fluid energy exchange directly with the high pressure accumulator (225) without rotary hydraulic motors or pumps.

6. The system of claim 1, wherein the ballast (34a) includes further means for energy harvesting enhancement, including vertical fins (44) directing fluid flow toward the vertical axis of the shell (31).

7. The system of claim 1, wherein the computer (231) includes control using algorithms in optimal control, and optimal state estimation, operable in any combination, for optimal efficiency in matters of wave sensing, fluid power transformation, and wave energy converter actuation.

8. A method of converting energy from recurring ocean waves, which comprises:
(a) positioning pressure sensors (25) adjacent to the sea floor beneath the area of recurring ocean waves and using the sensors (25) to measure the changing pressure as wave crests (26) and troughs (27) approach the wave energy convertor (10)(600) and pass over;
(b) using a computer (231) to calculate wave vectors (602), including wave height, speed, energy and position in terms of ocean-wave-degrees-before-top-dead-center, and analyze energy of one of the waves;
(c) using the computer (231) to automatically control operation of a wave energy converter (10) located shoreward from the position of the sensors (25), such wave energy converter (10) having a piston (32) oriented for up and down movement under pressure from waves passing over and
(d) operating a hydraulic system by reciprocating a piston (32) in a shell (31);
(e) holding the piston (32) in an upward shifted position until such time as a wave crest (26) is over or nearly over the piston (32) and then automatically releasing the piston (32) for downward motion in a power stroke to pressurize fluid of the assembly of hydraulic cylinders (50)(221);
(f) using the pressurized fluid to operate an energy conversion system including at least one rotary hydraulic motor (511) (512) and at least one rotary electric generator (510) driven thereby;
(g) thereafter automatically holding the piston (31) in the downward position until a wave trough (27) is over or nearly over the piston (31) and then automatically releasing the piston (31) and returning it to the upward shifted position by pressure of the hydraulic system.

9. A method of generating ocean waves, using electric energy which comprises:
(a) using a computer (231) to automatically control operation of a multiplicity of underwater wave energy converters (10) each having a piston oriented for periodic up and down movement by operation of a hydraulic system including hydraulic cylinders connected to the piston, reciprocating motion of the cylinders and piston being controlled by the computer to force water above the piston upward; and
(b) monitoring wave production and movement, and timing reciprocation of the pistons (31) to amplify a wave as it approaches and passes over the wave energy converters (10).

10. A method of converting ocean wave energy to electric energy including:
(a) using sensors (25) to measure changing pressure to determine wave crests (26) and troughs (27) approaching the wave energy converter (10)(600);
(b) using the computer (231) to select waves appropriate for harvesting (604) by calculating wave vectors (602), including wave height, speed, energy, and position in terms of ocean-wave-degrees-before-top-dead-centre;
(c) on finding a wave appropriate for harvesting, switching to instituting a power stroke (606) and beginning an energy conversion cycle by:
  (i) using the computer (231) to adjust the deflector (38) to an optimum position for capturing wave energy;
  (ii) holding the piston (32) in an upward shifted position until such time as a wave crest is over or nearly over the piston (32);
  (iii) releasing the piston (32) at optimum ocean-wave-degrees-before-top-dead-centre of the wave crest (26) to start downward motion in a power stroke (606) and pressurize fluid of the hydraulic system (210);
  (iv) monitoring the pressure of the cylinders (50a);
  (v) using the pressurized fluid to operate the energy conversion system including at least one rotary hydraulic motor (511,512) and at least one rotary electric generator (510) driven thereby;
(d) on completion of the power stroke (608), holding the piston (32) in the downward position (608) until a wave trough (27) is over or nearly over the piston (32);
(e) instituting a return stroke (610) automatically actuating the piston (32) at optimum ocean-wave-degrees-before-top-dead-centre of the wave trough (27) thereby evacuating the piston chamber while returning the piston (32) to the upward shifted position by pressure of the hydraulic system; and
(f) on completion of the return stroke (614), with the piston (32) in the uppermost position, assessing the energy of the incoming waves in preparation for the next power-stroke-return-stroke cycle.

* * * * *